United States Patent
Koster

(10) Patent No.: US 10,205,699 B1
(45) Date of Patent: Feb. 12, 2019

(54) CALLING PARTY NUMBER SELECTION FOR OUTBOUND TELEPHONE CALLS TO MITIGATE ROBOCALLING PROCESSING IMPACTS

(71) Applicant: Noble Systems Corporation, Atlanta, GA (US)

(72) Inventor: Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 16/164,467

(22) Filed: Oct. 18, 2018

Related U.S. Application Data

(63) Continuation of application No. 16/026,466, filed on Jul. 3, 2018, which is a continuation of application
(Continued)

(51) Int. Cl.
*H04M 3/00* (2006.01)
*H04M 5/00* (2006.01)
(Continued)

(52) U.S. Cl.
CPC ...... *H04L 61/2061* (2013.01); *H04M 3/5158* (2013.01); *H04L 61/605* (2013.01);
(Continued)

(58) Field of Classification Search
CPC .. G10L 15/00; G06Q 10/06; G06Q 10/06316; G06Q 30/016; H04L 51/02; H04L 51/046; H04L 51/24; H04L 51/30; H04L 61/2061; H04L 61/605; H04M 3/2281; H04M 3/323; H04M 3/36; H04M 3/4217;
(Continued)

(56) References Cited

U.S. PATENT DOCUMENTS 5,095,505 A 3/1992 Finucane et al.
5,210,789 A * 5/1993 Jeffus ...................... H04M 3/51
379/122
(Continued)

OTHER PUBLICATIONS

Noble Systems Corporation, Maestro 2010.1.1 User Manual, vol. 2, Aug. 3, 2010, 416 pages, Noble Systems Corporation, Atlanta GA 30319.
(Continued)

*Primary Examiner* — Khai N. Nguyen

(57) ABSTRACT

A contact center maintains a pool of calling party telephone numbers ("CPTN") that can be selected for call origination. A new CPTN can be selected based on various criteria in order to avoid, or respond to, a determination that the current CPTN is "tagged" as being a robocall. The triggering of a new CPTN can be initiated based on various factors, including a number of calls made, a time period, a change in call outcomes, direct input, or by querying a database maintaining status information. Upon triggering the selection of a new number, the old calling party number may be placed in a "dead" pool if tagged, or placed in an "aging" pool for where it is not used for a given time. Once aged, the number is placed in an "available for use" pool. Thus, impacts of service provider robocall processing can be mitigated.

20 Claims, 15 Drawing Sheets

Related U.S. Application Data

No. 15/728,733, filed on Oct. 10, 2017, now abandoned.

(51) Int. Cl.
*H04M 3/42* (2006.01)
*H04L 29/12* (2006.01)
*H04M 3/51* (2006.01)

(52) U.S. Cl.
CPC .............. *H04M 2203/551* (2013.01); *H04M 2203/558* (2013.01); *H04M 2215/0164* (2013.01)

(58) Field of Classification Search
CPC ........... H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/5158; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2202/551; H04M 2202/558; H04M 2242/00; H04M 2242/08; H04M 2242/12; H04M 4/14; H04W 4/14
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 5,274,699 A | | 12/1993 | Ranz |
| 5,283,824 A | | 2/1994 | Shaw |
| 5,590,184 A | | 12/1996 | London |
| 5,684,612 A | | 11/1997 | Wilde et al. |
| 5,740,538 A | | 4/1998 | Joyce et al. |
| 5,784,444 A | | 7/1998 | Snyder et al. |
| 5,901,209 A | | 5/1999 | Tannenbaum |
| 6,130,935 A | | 10/2000 | Shaffer et al. |
| RE37,073 E | * | 2/2001 | Hammond ...... H04M 1/274575 379/142.01 |
| 6,343,120 B1 | | 1/2002 | Rhodes |
| 6,449,351 B1 | | 9/2002 | Moss et al. |
| 6,643,363 B1 | | 11/2003 | Miura |
| 6,661,882 B1 | | 12/2003 | Muir et al. |
| 6,662,006 B2 | | 12/2003 | Glass |
| 6,684,336 B1 | | 1/2004 | Banks et al. |
| 6,831,974 B1 | | 12/2004 | Watson et al. |
| 6,876,736 B2 | | 4/2005 | Lamy et al. |
| 6,941,159 B2 | | 9/2005 | Tsai et al. |
| 7,020,256 B2 | | 3/2006 | Jain et al. |
| 7,099,445 B2 | | 8/2006 | Creamer et al. |
| 7,170,983 B2 | | 1/2007 | Gruchala et al. |
| 7,280,646 B2 | | 10/2007 | Urban et al. |
| 7,899,169 B2 | | 3/2011 | Siminoff |
| 8,135,122 B1 | | 3/2012 | Siminoff |
| 8,254,550 B1 | | 8/2012 | Serrano |
| 8,280,022 B1 | | 10/2012 | Trinidad et al. |
| 8,358,758 B2 | | 1/2013 | Serrano et al. |
| 9,398,148 B1 | | 7/2016 | Neuer et al. |
| 2002/0018547 A1 | | 2/2002 | Takae et al. |
| 2002/0044638 A1 | | 4/2002 | Gruchala et al. |
| 2002/0080942 A1 | | 6/2002 | Clapper |
| 2002/0145624 A1 | | 10/2002 | Szlam et al. |
| 2002/0146111 A1 | | 10/2002 | Hayashi |
| 2003/0147519 A1 | | 8/2003 | Jain et al. |
| 2003/0174825 A1 | | 9/2003 | Aldridge et al. |
| 2004/0017899 A1 | | 1/2004 | Garfinkel et al. |
| 2004/0101123 A1 | | 5/2004 | Garcia |
| 2004/0218743 A1 | * | 11/2004 | Hussain ........... H04M 3/42153 379/201.11 |
| 2004/0266415 A1 | | 12/2004 | Belkin et al. |
| 2007/0064895 A1 | | 3/2007 | Wong et al. |
| 2007/0263819 A1 | | 11/2007 | Finkelman et al. |
| 2007/0263853 A1 | | 11/2007 | Pearson et al. |
| 2008/0089501 A1 | | 4/2008 | Benco et al. |
| 2009/0094235 A1 | | 4/2009 | White et al. |
| 2010/0040049 A1 | * | 2/2010 | Benedyk .......... H04L 29/12896 370/352 |
| 2010/0088319 A1 | | 4/2010 | Van Natter et al. |
| 2014/0192965 A1 | * | 7/2014 | Almeida ................ H04M 3/436 379/70 |
| 2015/0071427 A1 | * | 3/2015 | Kelley ................ G06Q 30/0202 379/265.09 |
| 2015/0213512 A1 | * | 7/2015 | Spievak ............. G06Q 30/0275 705/14.71 |
| 2017/0230329 A1 | * | 8/2017 | Akef .................... H04L 61/2076 |

OTHER PUBLICATIONS

Noble Systems Corporation, Maestro 2010.1.1 User Manual, vol. 1, Aug. 17, 2010, 454 pages, Noble Systems Corporation, Atlanta, GA.
Nobles Systems Corporation, Maestro 2010.4.1 User Manual, vol. 2, Jul. 19, 2011, 422 Pages, Noble Systems Corporation, Atlanta, GA 30319.
Noble Systems Corporation, Maestro 8.0 User Manual vol. 1, Aug. 21, 2015, 596 Pages, Noble Systems Corporation, Atlanta, GA.
Noble Systems Corporation, Maestro 8.0 User Manual vol. 2, May 8, 2015, 486 Pages, Noble Systems Corporation, Atlanta, GA.
Rootsecure.net, downloaded from Web on Apr. 26, 2012, two pages, http:www.rootsecure.net/?p=reports/callerid_spoofing.
How to Stop Calling Features from Blocking Calls, Century Link, 3 pages. Downloaded on Jul. 2, 2018.
No Solicitation Guide, Century Link, 2 pages, downloaded Jul. 2, 2018.
Latest Ways to Deal with Robocalls, Consumer Reports, 10 pages, downloaded Jul. 2, 2018.
You May Need to Adjust Your Calling Practices, InsideARM.com, 3 pages, downloaded Jul. 2, 2018 from www.insidearm.com/new/00043996-you-may-need-adjust-your-calling-practice/.
Robocalling and Call Spoofing FAQ, Neustar Communications, 13 pages, downloaded Jul. 2, 2018.
Spam Flagging and Call Blocking and its Impact on Survey Research, American Association for Public Opinion Research, 23 pages.
The Robocall Nightmare is Only Getting Worse—But Help is Here, Lily Hay Newman, 3 pages, downloaded Jul. 2, 2018.
U.S. Pat. No. Re. 37,073—U.S. Reissue Patent, Automatic Call Back System and Method of Operation, Date of reissue Feb. 27, 2001 by Daniel D. Hammond. (IDS Form does not allow entering REissue patent numbers in the patent section.).

\* cited by examiner

CALLING PARTY NUMBER SELECTION FOR OUTBOUND TELEPHONE CALLS TO MITIGATE ROBOCALLING PROCESSING IMPACTS

CROSS REFERENCE TO RELATED APPLICATIONS

This application is a continuation of U.S. patent application Ser. No. 16/026,466, filed on Jul. 3, 2018, which in turn is a continuation of U.S. patent application Ser. No. 15/728,733, filed on Oct. 10, 2017, entitled "Calling Party Number Selection For Outbound Telephone Calls To Mitigate Robocall Processing Impacts," the contents of both of which are incorporated by reference.

BACKGROUND

Contact centers are frequently retained by an enterprise to contact the enterprise's customers. One common application involves the contact center contacting customers having a credit account with, or loan from, the enterprise having a past due balance. The contact center may contact the customer to discuss an outstanding balance, payment terms, etc. Such calls are sometimes referred to as "debt collection" calls, even though the caller may not fall within a legal definition of a debt collector. In many cases, the contact center may repeatedly call the customer in attempts to contact the customer.

The common availability of caller-identification ("caller-ID") technology allows the called party to see the calling number for an incoming call before the call is answered. The calling party number is also sometimes referred to as the ANI ("automatic number identification) based on the capability that delivered the calling party telephone number. For purposes herein, the term ANI, calling party telephone number ("CPTN"), and calling party number ("CPN") are assumed to have the same meaning.

As can be expected, called parties often attempt to avoid answering debt collection calls or other calls which may be unwanted. Caller-ID technology, as well as other services that block calls from a specified originating telephone number, can impede the communication between the contact center and the called party. Called parties may report such telephone numbers as originating from debt collectors, or report such numbers as being telemarketing calls. The report may be received by a service provider that tags the CPTN as being a 'robocall' Using the same ANI value for repeated debt collection calls (or any other) may result in that number being reported as being associated with debt collection (or some other type of activity). The call may then be blocked to the called party by the called party's service provider. Furthermore, if an out-of-region ANI is presented to the called party, the called party may be hesitant to answer the call as compared to a call having a local ANI, i.e., one having the same area code and central office code. Furthermore, if the ANI is out-of-region, the called party may be more hesitant to return the call, since long distance charges may be involved.

Using a local ANI is a common practice in various applications. However, with various 'robocall' related call processing services being offered by service providers, a particular ANI or CPN may be "tagged" as being a robocall of some form. Frequently, such calls are presented with a label or other text-based indicator informing the called party the call may be a certain type of call, e.g., "spam" or a "scam." Such calls may be blocked or the called party may not answer the call because of the label. If the call is erroneously tagged as being a robocall, then the called party may not answer, nor receive an important call. For example, an emergency or other unusual situation may cause a business, school, or public safety office to originate a large number of calls in a short time period. It is possible that the robocall call processing techniques may erroneously identify such calls as being robocalls, and incorrectly label or block the calls. The intended called parties may not receive important notifications.

Thus, it is necessary to define procedures and techniques related to the use of the CPN that can mitigate the adverse impacts that may be encountered due to robocall processing. It is with respect to these and other considerations that the disclosure herein is presented.

BRIEF SUMMARY

Technologies are generally presented herein pertaining to selecting a calling party telephone number to use in originating an outbound call from a contact center to mitigate potential impacts of robocall call processing. In one embodiment, the calling party number is selected from a pool of calling party numbers allocated for an area that may be local to the called party. The calling party number can be selected from the pool of local numbers by using various algorithms. Further, various criteria may be used to change the calling party telephone number used so as to avoid or respond to an indication that the calling party number is tagged as being a robocall, and thus subject to robocall call processing treatment.

The subject matter disclosed herein may be implemented as a computer-controlled apparatus, a computer process, a computing system, or as an article of manufacture such as a non-transitory computer readable storage medium comprising computer instructions. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
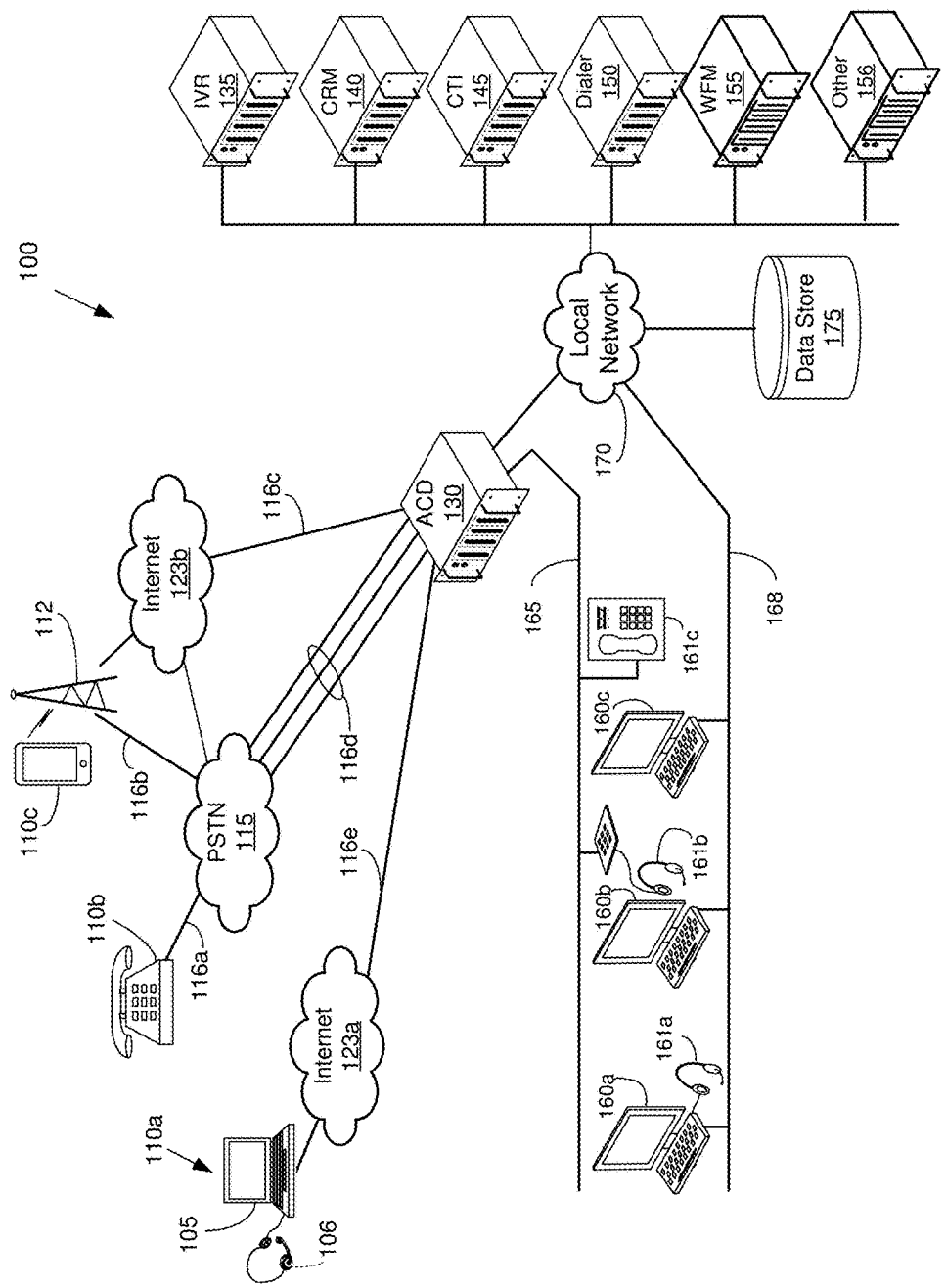
FIG. 1 shows one embodiment of a contact center architecture.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

It is common for the calling party number ("CPN", a.k.a. as calling party telephone number "CPTN" or automatic number identification "ANI") to be displayed to the called party using various caller-ID technologies. This feature allows the telephone number of the calling party (the contact center) to be displayed, whether it be on a mobile phone or a landline telephone. In various circumstances, a called party may view the CPN and choose not to answer the phone. The called party may recognize that the CPN is a telephone number that is not local, and decide not to answer the call. If a message is left, the called party may not return the call because long distance charges may be incurred. Alternatively, the called party may recognize the CPN as being associated with a debt collection call.

One aspect of the current disclosure generally pertains to selecting a CPN for a call originating from a contact center to a called party. The CPN used in originating the call can be selected from a pool of local or non-local telephone numbers ("TN"). Further, the CPN can be changed by replacing it with another value selected from a pool based upon various criteria, including whether the number has been tagged or about to be tagged as a robocall. Reference to a "local" number means one that shares the same area code, or area code and central office code, as with the called party number. The CPN, when dialed, may be routed back to the contact center or to another location, which may be in another area. The CPN numbers selected from this TN pool can be rotated in/out so that the called party is presented with a varying local number on different calls. Each call appears to be from a local number, and may not be recognized by the called party as being a debt collection call. Further, altering the CPN periodically may avoid the number being tagged as a robocall. Further, the enterprise may periodically "refresh" the pool with local numbers after the numbers are tagged as being associated with a robocall label and/or become recognized by the called party.

Further, the introduction of robocall call processing capabilities recently deployed by various service providers may result in treating calls using a specific CPTN as a robocall. For purposes herein, a robocall may be presumed to be any call that when answered plays a recorded announcement to the called party, although there is no common industry consensus on this term. The treatment provided by a service provider upon detecting an alleged robocall may involve blocking the call, so that it is not offered to the called party, or labeling the call. Labeling the call involves delivering a text-based label, such as "telemarketer", "spam", "scam likely", etc. to the called party when the call is offered. This may involve a mobile application on a smart phone configured to display the label or a caller-ID device on a wireline phone. This robocall call processing may be applied when a large number of calls are noticed using a particular CPN. Further, input from called parties may be considered by a service provider in ascertaining the label. For example, many of the mobile applications associated with robocall processing allow the called party to easily report a call as a robocall and a service provider may update a robocall database using that call's CPN. Thus, a caller can report a CPN as being "spam" and the service provider, after receiving a threshold number of such reports, may "tag" that CPN as being a robocall. Then, any subsequent calls observed in the carrier's network using that CPN may be blocked or labeled.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Although many aspects of contact center operation is disclosed in the context of voice calls, the contact center may process other forms of communication such as facsimiles, emails, text messages, video calls, chat messages, and other forms. Since the contact center may handle calls originating from a calling party, or initiated to a called party, the term "party" without any further qualification refers to a person associated with a call processed by the contact center, where the call is either received from or placed to the party.

Inbound voice calls may originate from calling parties using a variety of phone types. A calling party may originate a call from a conventional analog telephone 110*b* connected to a public switched telephone network ("PSTN") 115 using an analog plain old telephone service ("POTS") line 116*a*. The calls may be routed by the PSTN 115 and may comprise various types of facilities 116*d*, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110*c*, such as a smart phone or tablet, which wirelessly communicates with a mobile service provider ("MSP") 112. The voice calls may be routed to the PSTN 115 using an integrated services digital network ("ISDN") interface 116*b* or other types of interfaces that are well known to those skilled in the art. The MSP 112 may also route calls as packetized voice, referred to herein as voice-over-IP ("VoIP") to an Internet provider 123*a* using Internet-based protocols. For convenience, unless indicated otherwise, the term "trunk" refers to any type of facility 116*c*, 116*d*, or 116*e* providing voice calls to, or from, the contact center, regardless of the type of protocol or technology used. Specifically, a "trunk" is not limited to time-division multiplexing ("TDM") technology.

Voice calls may also originate from a calling party employing a so-called "IP phone," "VoIP phone," or "soft phone" 110*a*. In one embodiment, this device may comprise a computing device 105, such as a laptop or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123*a*, such as a cable company providing Internet access services over a coaxial cable facility 116*e*. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110*a*, conventional telephone, 110*b*, a mobile device 110*c*, or other device known in the art. The term "call" as used herein may mean an active instance of two-way communication, an attempt to establish two way communication, or a portion of the two-way communication. For example, a user at a conventional telephone 110*b* can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a numberof concatenated call legs, as known to those skilled in the art. In certain contexts, which will be made explicit, the call may encompass communications other than voice, e.g., text, email, video chat, facsimile, etc.

Inbound calls from callers to the contact center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over contact center facilities 165 to an available agent. The facilities 165 may be any suitable technology for conveying the call, including but not limited to a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160*a*-160*c* and a voice device 161*a*-161*c*. The combination of computer and voice device may be referred to as a "workstation." Thus, the workstation collectively has a data capability and a voice capability, though separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position.

The voice device used by an agent may be a soft phone device exemplified by a headset 161*a* connected to the computer 160*a*. The soft phone may be virtual telephone implemented in part by an application program executing in a computer. The phone may also comprise an Internet Protocol ("IP") based headset 161*b* or a conventional phone 161*c*. Use of the term "phone" is intended to encompass all these types of voice devices used by an agent, unless indicated otherwise.

An agent typically logs onto their workstation prior to handling calls. This allows the contact center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A contact center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a contact center to control and/or coordinate other components of the contact center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." For purposes herein, this is the same as the calling party number ("CPN") or calling party telephone number ("CPTN"). This information indicates the identity of the calling party, in the form of a telephone number. In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service) to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data are presented at the agent's headset 161*b* and their computer 160*b*.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other servers, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160*a*-160*c*, as well as other components, may involve using a local area network ("LAN") 170. Other configurations are possible, such as, but not limited to, using a wide area network, wireless network, router, bridge, direct point-to-point links, etc.

When an agent is interacting with a called or calling party, the agent may use their workstation computer 160*b* to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles, the contact center may also originate communications to a called party, referred to herein as "outbound" communications. In some embodiments, a contact center may employ a dialer 150, such as a predictive dialer, to originate outbound calls on behalf of an agent at a rate designed to meet various criteria. Similar to the other components within the contact center architecture 100, the dialer 150 may comprise a software module executing on processing device hardware platform.

The dialer 150 is typically configured to dial a list of telephone numbers to initiate outbound calls, which can be accomplished in one embodiment by instructing the ACD 130 to originate calls. In some embodiments, the ACD may include functionality for originating calls, and if so, this component may be referred to as a private automatic branch exchange ("PBX" or "PABX"). In other embodiments (not shown), the dialer 150 may directly interface with voice trunks using facilities 116*c*, 116*d* to the PSTN 115 for originating calls. After the calls are originated, a transfer operation by the ACD 130 or the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in a contact center is a workforce management ("WFM") server 155. This server maintains information to generate agent's schedules to effectively handle inbound/outbound calls. The WFM server 155 may maintain historical call volume information for call campaigns and forecast expected call volume to predict the number of agents needed to handle the call volume at a defined service level. The WFM server 155 can then apply information about available agents to then generate a work roster of agents. In other words, the WFM server 155 schedules agents for their work shifts according to the anticipated needs of the call campaigns.

Finally, in various embodiments, the contact center architecture 100 may include another server 156 to perform various functions. For example, the server 156 could be a quality assurance system that records communication fielded by an agent or allows a manager to monitor a voice session to ensure calls are being handled correctly.

Although the above components may be referenced as a "component," each may be also referred to in the art as "units," "processors", "processing system" "server" or "systems." A processing system may incorporate a local data store, database, or interface with an external database. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into a single hardware platform executing one or more software modules. In addition, the contact center architecture 100 may be provided as a hosted solution, where the call processing functionality is provided as a communication service (a so-called "communication as a service" or "CaaS") to a contact center operator. Thus, there is no requirement that the servers identified above actually be located or controlled by a contact center operator.

In addition, the agent positions can be co-located in a single physical contact center or multiple physical contact centers. The agents can be remotely located from the other components of the contact center, and may also be remotely located from each other, sometimes referred to as a "virtual contact center." A virtual contact center may describe a scenario where agents work at home, using their own computers and telephones as workstations. In some configurations, a single physical location of the contact center may not be readily identifiable. This may occur when the call processing functions are provided as a service in a hosted cloud computing environment and the agents positions are in their individual residences.

Those skilled in art will recognize FIG. 1 represents one possible configuration of a contact center architecture 100, and that variations are possible with respect to the protocols, facilities, technologies, and equipment used. For example, various algorithms and queuing arrangements may be defined to efficiently process calls. In other configurations, the ACD 130 may be configured to process not only voice calls, but also other forms of communication, and perform corresponding call processing functions for email, text, or facsimile calls. Alternatively, a web server (not shown in FIG. 1) may receive or originate email and text communications, as well as interact with other contact center components.

ANI Scrambling

For purposes of reference herein, a telephone number is presumed to be a ten digit number that is formatted as: NPA-NXX-XXXX. The NPA is the numbering plan area, or more commonly referred to as an area code. The NXX may be referred to as a central office code (which originated with wireline telephone switches located in a central office) or a prefix code. Since many communication services involve mobile users, the NXX will simply be referred to as the NXX code. The last four digits, XXXX, may be referred to as the line number.

In many telecommunications services, such as residential telephone service, the ANI used for a call is determined by the carrier, such as the PSTN. For example, if a residential telephone originates a call, then the telephone number associated with that telephone line is used as the ANI by the PSTN. However, other telecommunication services, such as various business services, allow the originating party to select a particular ANI to be used when originating a call. Thus, the ANI can be selected by the originating party on a per-call basis.

If a default or same value of the ANI is always used, and the contact center is in another area, then the called party may likely recognize the ANI as e.g., a debt collection call. Or, the call may be tagged as being a robocall. The ability of the contact center to select an ANI having different values for different calls is referred to herein as "ANI scrambling."

Figure 2:
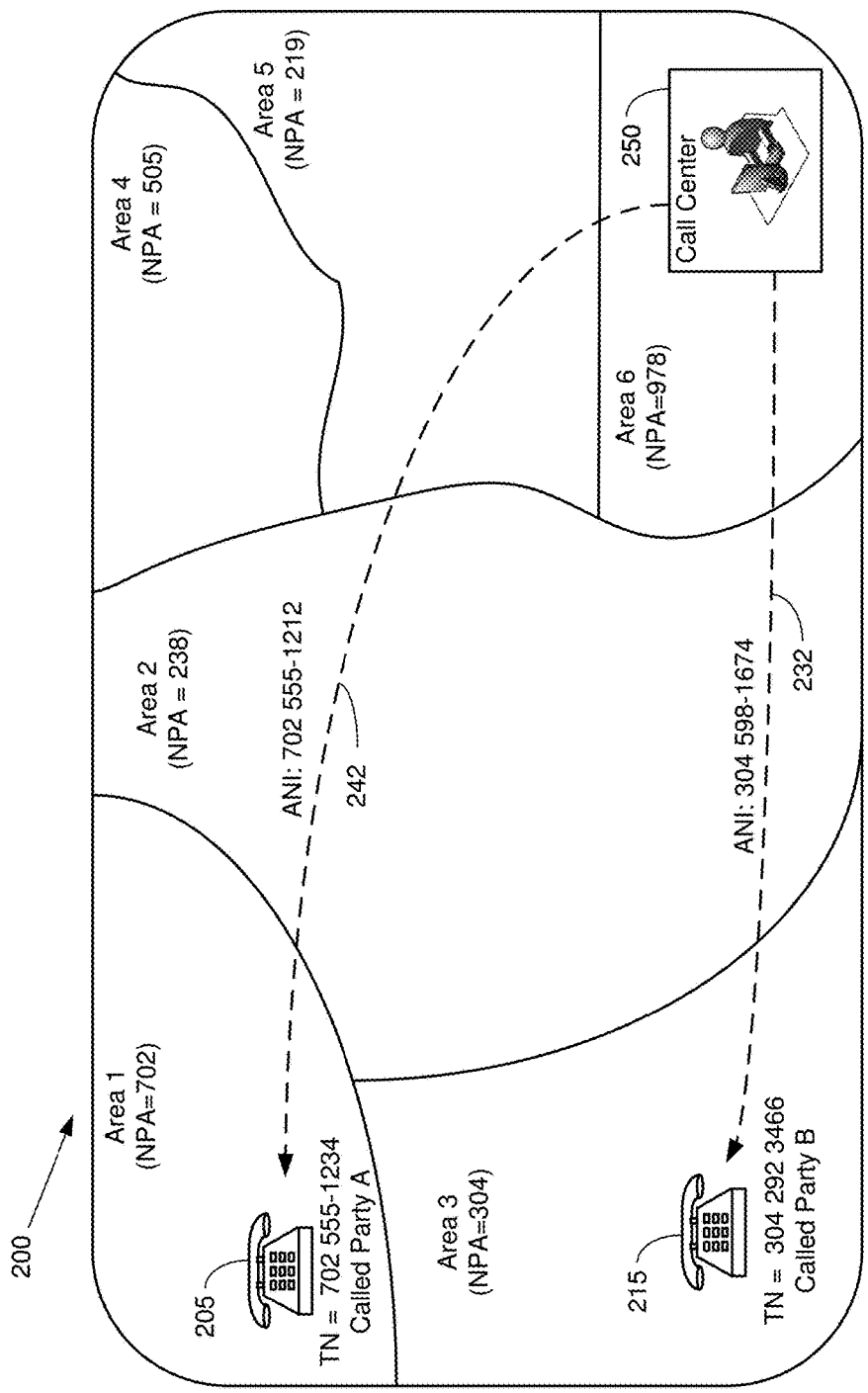
FIG. 2 shows one embodiment of different called areas potentially associated with call originations from a contact center.

When selecting the ANI to use, there is a benefit, in some cases, from selecting an ANI that has the same NPA code, and potentially the same NXX code, as the called party number. This can be illustrated in FIG. 2. FIG. 2 shows a geographic map 200 in diagrammatic form that represents various designated areas (or simply "areas"). The areas can represent different areas in a country, region, or state. Area 1 is associated with a region and is allocated an NPA=702. Area 2 is another region and is allocated with NPA=238. Area 3 is allocated NPA 304. Area 4 is allocated NPA 505, and Area 5 is allocated NPA 219. Finally, Area 6 is allocated NPA 978 and this is the area in which a contact center 250 is located.

The NPA codes assigned to the areas shown in FIG. 2 may be actual area codes and may be actually assigned to actual regions, (e.g., NPA 304 is allocated to West Virginia and NPA 702 is allocated to Nevada). However for purposes of illustration, the areas designated with an NPA code are for exemplary purposes. Specifically, FIG. 2 shows that Area 1 and Area 3 share a common border, but in reality West Virginia does not share a common border with Nevada. The reader will understand that FIG. 2 is for exemplary purposes and is for illustrating the concepts of the technologies.

In FIG. 2, the contact center 250 may attempt to originate a call to Called Party A 205 having a telephone number ("TN") of 702-555-1234. The contact center originating the call is in Area 6 and may have an ANI that includes NPA=978. Specifically, for purposes of illustration, the contact center may be assigned a telephone number of 978-295-5555. However, originating a call using that telephone number as the ANI will result in the called party seeing the corresponding ANI of 978-295-5555. In other instances, the contact center may be located outside the U.S., and the area code or number could be recognized by the called party as being outside the U.S.

In either case, the Called Party A may recognize the out-of-region NPA as being associated with a debt collection call. Further, Called Party A may be hesitant to return the call, since it is an out-of-region area code, and it may result in long distance charges. This would be especially likely if the ANI was for a telephone number based outside the U.S. It would be preferable for the ANI to have the same area code as the called party, and potentially with the same NXX code as the called party. Specifically, the call 242 in FIG. 2 could be originated using an ANI of, e.g., 702-555-1212. When the ANI is viewed by Called Party A, the ANI having a NPA-NXX code of 702-555 appears to the called party to be a local call. Called Party A may be more likely to answer the call, or to call back the contact center.

Similarly, if the contact center 250 is originating a call 232 to Called Party B 215 having a TN of 304-292-3466, then the ANI for that call can be, e.g., 304-598-1674. In this scenario, the NPA is the same (e.g., 304) but the NXX code is different. Nevertheless, Called Party B 215 may presume that the call originated from Area 3, and may be more likely to answer the call or return the call.

Over time, the called party may learn to recognize that the local number (304 598-1674) is associated with a debt collection call. Or, a service provider may label or block that number on behalf of their subscriber. The called party may employ various types of blocking mechanisms that operate on that particular ANI value. Thus, merely using a local number as the ANI by the contact center may, over time, not be effective in establishing contact with the called party.

Figure 3:
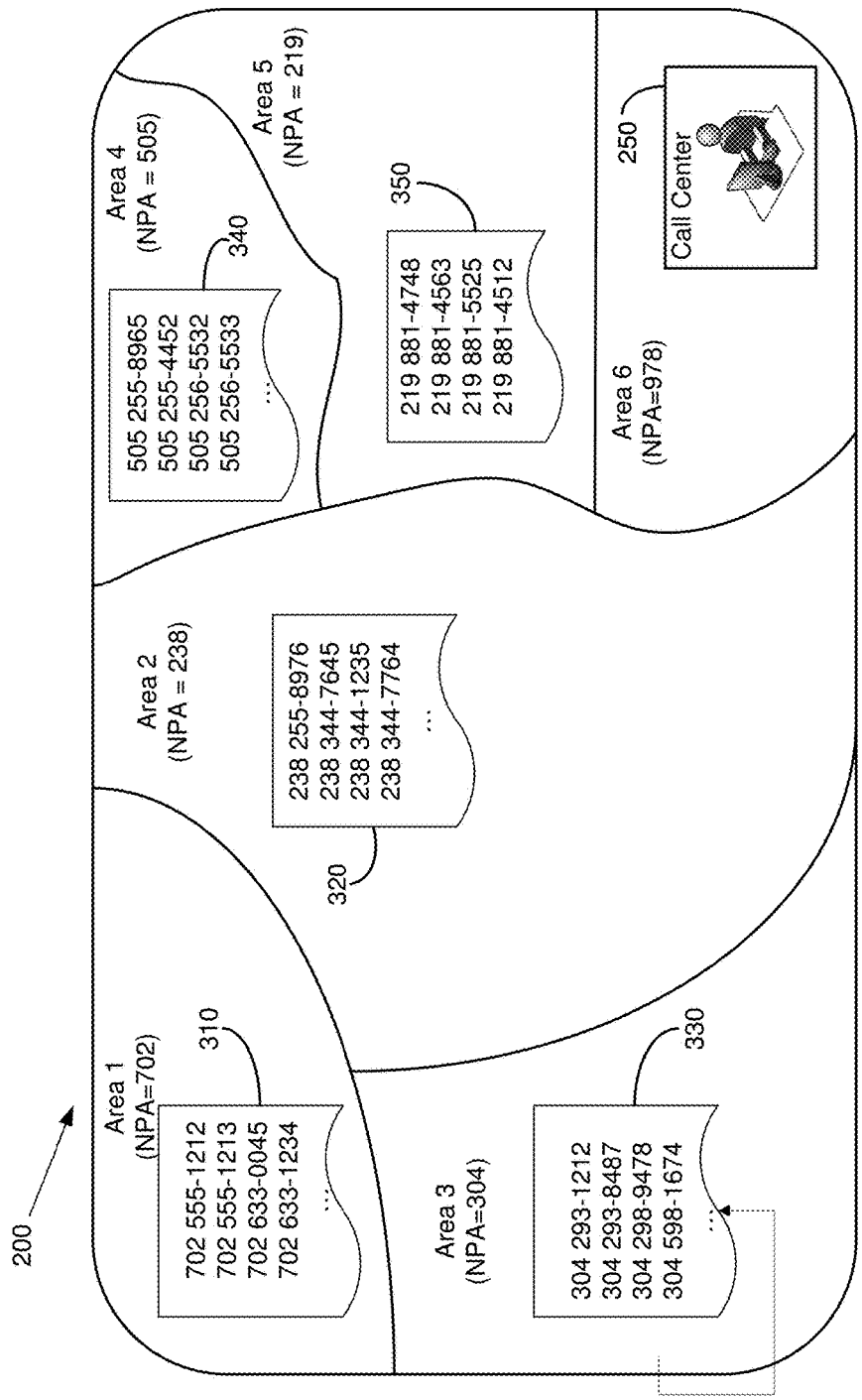
FIG. 3 shows one embodiment of allocating telephone number pools to different called areas.

FIG. 3 illustrates how local TN pools can be used to ensure that various local telephone numbers are rotated in use when the call center originates calls. In FIG. 3, the map 200 displays the various areas, and each area is associated with a list of numbers (the TN pool) having the same area code as the corresponding area. Specifically, Area 1 is associated with a pool or table 310 of telephone numbers, which includes as a first number 702-555-1212. This is the same area code associated with Area 1. Further, there are two different NXX codes indicated in the table—one for 555 and the other 633. Similar tables are defined for the other areas. Specifically, Area 2 in NPA 238 is associated with a table 320 of local numbers that have a NPA of 238, Area 3 is associated with a table 330 of local number with area code 304, Area 4 in area code 505 is associated with a table 340 with local numbers with the 505 NPA, and Area 5 in area code 219 is associated with a table 350 of local numbers with an NPA of 219.

Turning to Area 5 in greater detail, the local TNs in this tablet 350 all have the same NXX code—881. Each table may have a number of local TNs, and for illustrative purposes, it is assumed that there are ten numbers in each table. In other embodiments, the number of local TNs in the pool may vary on the area population size or the number of anticipated calls to each region, etc. Table 330 has NXX codes 293, 298, and 598. In various embodiments, the number of NXX code may be varied, or the same, based on demographics or other considerations.

The various tables of TN pools 310, 320, 330, 340, 350 are shown in each associated region. In reality, this is merely a logical illustration of how the tables are associated with each area, as the tables are typically stored in the contact center, which in this example is located in Area 6. Thus, when the contact center 250 originates a call to a called party in Area 2, the contact center can select one of the numbers from table 320 as the ANI for that call.

Figure 4:
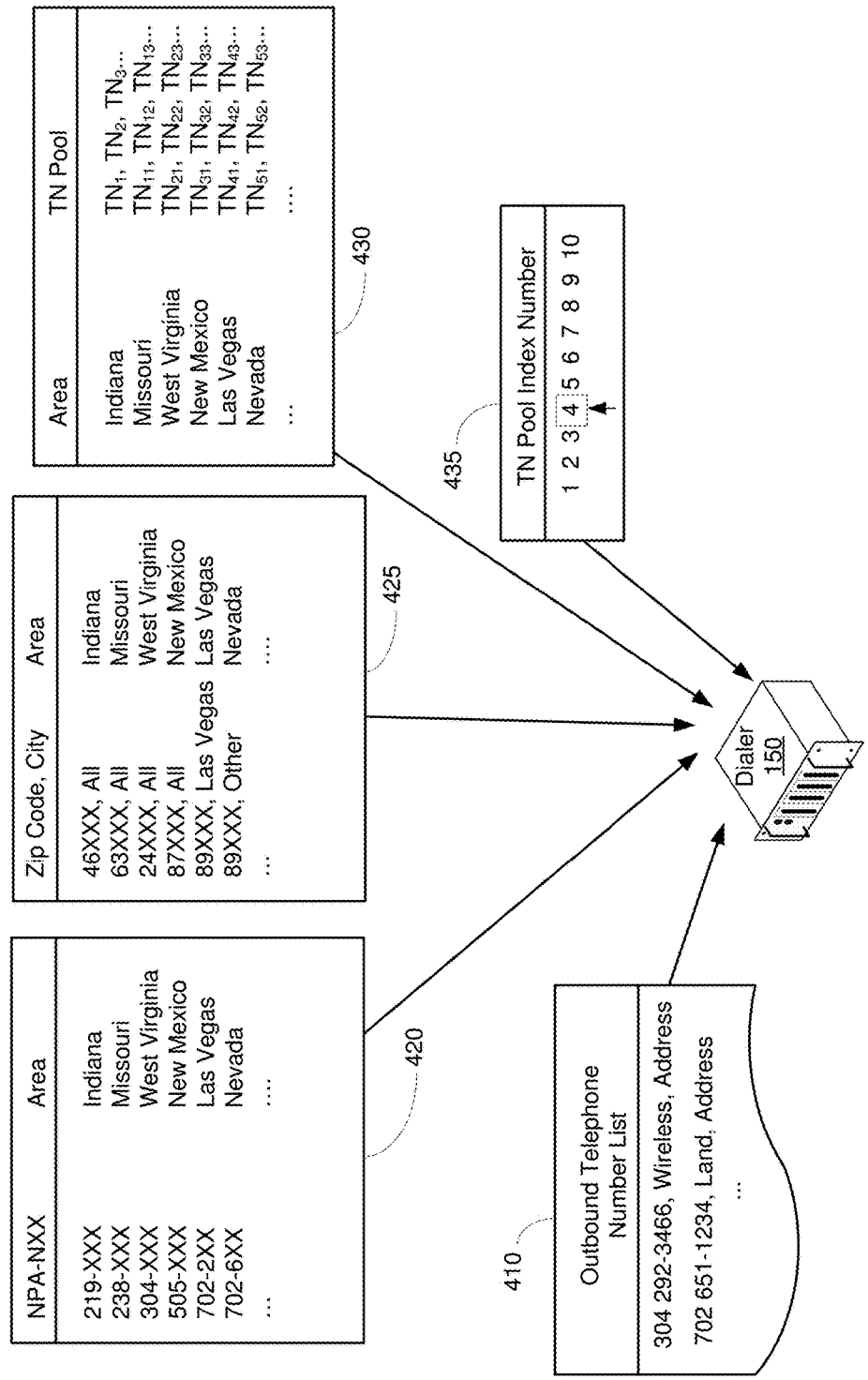
FIG. 4 shows one embodiment of data structures used to select an ANI from a pool of telephone numbers for a particular called area.

When the contact center originates the call, it may use a dialer 150. The dialer 150 may employ various algorithms for selecting the ANI number to use from a local TN pool. This is illustrated in FIG. 4. In FIG. 4, the dialer 150 may store or access information in an outbound telephone number list 410. In this embodiment, the first two numbers are 304-292-3466 and 702-551-1234. These correspond to the telephone numbers for Called Party B 215 and Called Party A 205 from FIG. 2. The outbound telephone number list may contain hundreds of telephone numbers, although only two are discussed for purposes of illustrating the principles of the disclosed technologies.

Furthermore, in this particular embodiment, the outbound telephone number list 410 includes additional information along with each listed telephone number. In this instance, the additional information indicates whether the telephone number is a landline (wireline) or wireless telephone number and an address of the individual associated with the telephone number, although it should be understood that additional or different information may be included in other embodiments. For example, in other embodiments, the outbound telephone number list 410 may not include information on whether the telephone number is a landline or wireless telephone number, but instead the contact center may ascertain such information from various commercial databases or services that are available. However, generally speaking, the additional information provided in various embodiments includes one or more pieces of information identifying, or that can be used to identify, an area designation of a location associated with the corresponding outbound telephone number such as, for example, an address, zip code, city, and/or state for the individual associated with the outbound telephone number.

Accordingly, the additional information is provided in the outbound telephone number list 410 shown in FIG. 4 for this particular embodiment to facilitate using a different process for selecting the ANI number to use from a local TN pool based on whether the outbound telephone number is a landline number or a wireless number. A different process is used because various aspects of wireless telephone numbers can complicate the determination of a called party's actual local area. Landline telephone numbers were historically assigned to a wire center (e.g., switching telephone office) in blocks of numbers defined by an area code and central office code. Thus, knowing the NPA-NXX of a landline telephone number allowed one to ascertain the local area for the telephone number. For example, knowing a landline telephone number has a NPA-NXX of 404-847 would allow one to know that an individual associated with such a number is served in the vicinity of Atlanta, Ga.

However, knowing such information for a wireless telephone number does not always allow one to make such a determination because of number portability. Number portability allows telephone numbers to be "ported" from a first landline or wireless carrier to a second landline or wireless carrier. Although porting a telephone number from one carrier to another may be limited with regards to geography, once a telephone number has been ported to a wireless carrier, the telephone number can easily be physically transferred from one local area to another. For example, an individual may move or relocate to another part of the country without giving up his wireless number. Thus, even though the individual may have originally subscribed to wireless service while living in Chicago, he may now be living in New York and still retain his wireless number having a NPA-NXX that was originally associated with the Chicago area. Therefore, as will be seen, the additional information provided in the outbound telephone number list 410 may be used to help address such occurrences by facilitating using a different process for selecting the ANI number to use from a local TN pool based on whether the outbound telephone number is a landline number or a wireless number.

Continuing on, depending the embodiment, the dialer 150 may also store or access one or more area mapping tables. Accordingly, FIG. 4 includes a first area mapping table 420 that maps a NPA-NXX to an area and a second area mapping table 425 that maps a zip code and city to an area. In this embodiment, the area in both tables 420, 425 is given a text based name corresponding to a state or city. In other embodiments, other nomenclature may be used. For example, regional names, metropolitan statistical areas ("MSA") or rural statistical areas ("RSA") designations may be used. In the two area mapping tables 420, 425, the NPA-NXX codes and zip codes may incorporate wildcard designators so that all NXX codes in a NPA area or zip codes are mapped to the same area. For example, all NXX codes in the 219 area code are mapped to the area "Indiana" and all the 46XXX zip codes are also mapped to the area "Indiana."

In other embodiments, the NXX codes and/or zip codes can be distinguished. For example, the 702 area code (Nevada) in the first area mapping table 420 may distinguish between calls that are associated with a city (Las Vegas) and the rest of the state. Thus, the 702-2XX codes (e.g., 702-234, 702-255, 702-257, etc.) may be mapped to a city, where as other codes, such as 702-6XX, are mapped to the greater state area. The same distinction can be made with respect to the 89XXX zip code in the second area mapping table 425 simply based on the city itself. Those skilled in the art will recognize in light of the present disclosure that various approaches can be used to define the area mapping tables 420, 425.

Table 430 is the area-to-TN pool mapping table. The area-to-TN pool identifies a set of local telephone numbers that are associated with the designated area. As noted before, it is assumed for purposes of illustration that there are ten local telephone numbers for each area. Thus, for the Indiana area, there may be ten TNs in the local pool. This could include, e.g., the local TNs from table 350 in FIG. 3, namely the TNs including: 219-881-4748; 219-881-4563; 219-882-5525, etc.

The dialer 150 may also maintain a TN pool index number 435. The TN pool index number is a value that changes over time, and which is used to select a number from the appropriate TN pool. The TN pool index value may be a value that is rotated on a periodic basis. As shown in FIG. 4, the current value is set to 4. This can be incremented or decremented on a daily basis, hourly basis, per call basis, etc. When the value of 10 is reached, it returns back to 1. Thus, the TN pool index value may be a circular index value. If the value is set, e.g., to 4, then the $4^{th}$ TN in the selected TN pool is used for the ANI on the next outgoing call.

In other embodiments, the index value has a maximum value as the same number as the number of telephone numbers in a pool. In other embodiments, each telephone number pool could have a different number of telephone numbers and involve a corresponding, different index number. For example, if a pool had 10 telephone numbers, then the index could have values of 1-10. If another pool had 8 telephone numbers, then another index could be used which has values of 1-8.

Figure 5:
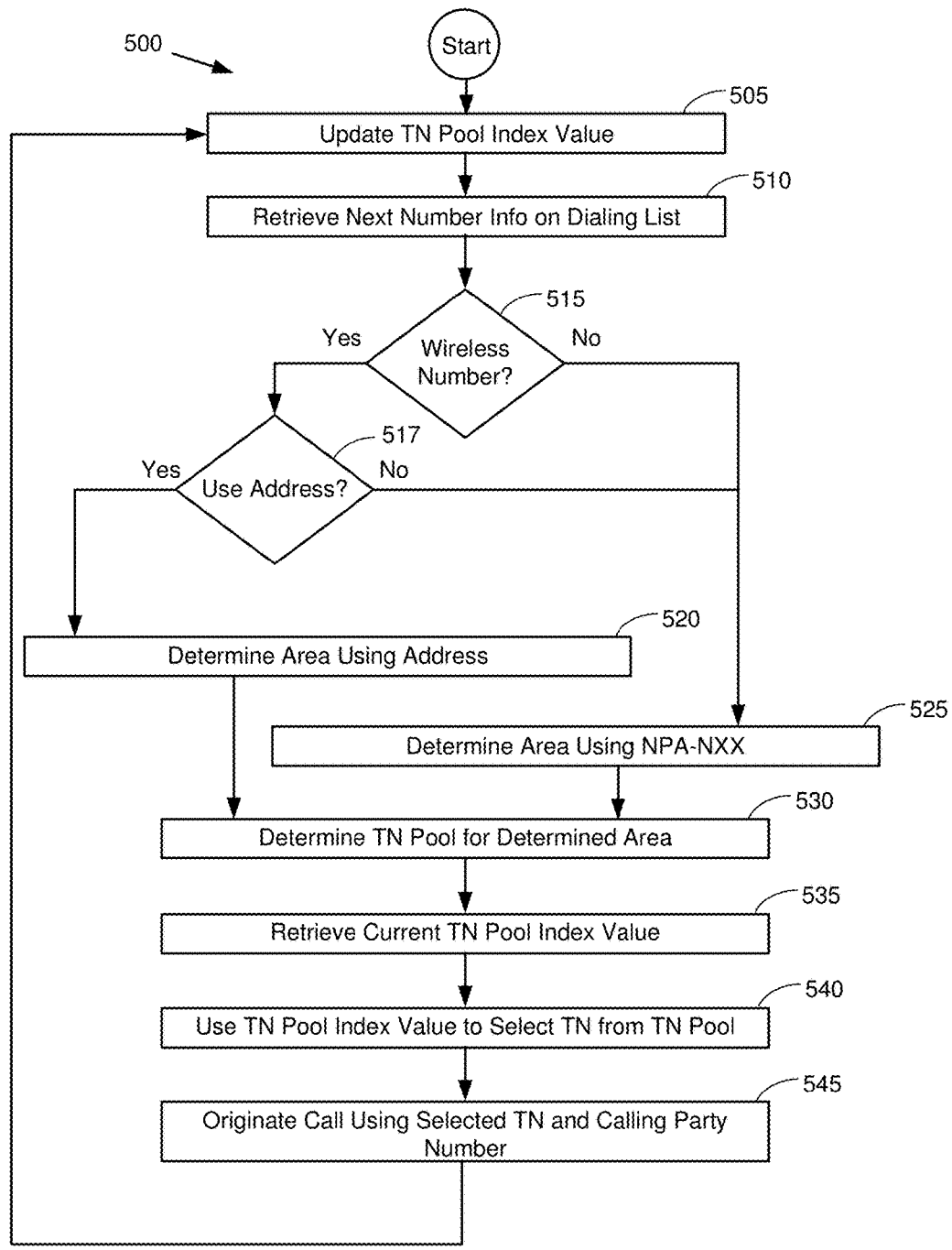
FIG. 5 shows one embodiment of a process flow for selecting an ANI from a pool of calling party telephone numbers to be used when originating a call to a particular called area.

FIG. 5 illustrates the ANI selection process using the above tables in further detail. The logical operations described herein may be implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. Additional or fewer operations may be performed than shown in the figures and described herein. These operations may also be performed in a different order than those described herein.

Turning to FIG. 5, the process begins with operation 505 in which the TN pool index value is optionally incremented. This ensures that periodically, the index value, and the ANI is changed. In this manner, whenever calls are made to a region, a different ANI may be used. With respect to FIG. 4, if the TN pool index number table 435 was previously set to the value 3, then this operation would increase it to the value of 4 as indicated in table 435.

In operation 510, the next number and corresponding information on the dialing list is retrieved. These may be numbers associated with a particular calling campaign. The retrieved number is the called party telephone number, to which the call is established. Returning back to FIG. 4, the first outbound telephone number in the dialing list (outbound telephone number list 410) is 304-292-3466.

At this point, a determination is made as to whether the outbound telephone number is a wireless number in operation 515. Thus, depending on the embodiment, information required for making such a determination may be found in the dialing list or from some other source such as various commercial databases and/or services that are available and provide such information. Accordingly, if the process determines the outbound telephone number is a wireless number, then the process determines whether to use the address or the outbound telephone number of the called party to determine the area of the called party's location in operation 517. If the address is determined to be used, then depending on the embodiment, the address may be retrieved from the dialing list or from some other data source internal or external to the contact center. However, if the telephone number is to be used, then the area is determined using the NPA-NXX portion of the outbound telephone number in operation 525. Likewise, if the process at operation 515 determines the outbound telephone number is not a wireless number, then the process determines the area using the NPA-NXX portion of the outbound telephone number in operation 525.

Thus, using the example of the outbound TN 304-292-3466, the dialing list indicates the number is a wireless number. Assuming the address is to be used to determine the location, the address information is retrieved indicating a zip code of 24342. Accordingly, the process examines the second area mapping table 425 and finds all 24XXX zip codes for all cities map to the area of West Virginia in the table. In turn, the TN pool for West Virginia is determined to be the applicable pool of telephone numbers based on the determined area in Operation 530.

In operation 535, the current TN pool index value is retrieved. Examining table 435, this value is set to 4. This value is used in operation 540 to then retrieve the $4^{th}$ number in the appropriate TN pool. Using table 430, the area of West Virginia is assigned to a pool of local numbers, namely $TN_{21}$, $TN_{22}$, $TN_{23}$, $TN_{24}$ . . . . Based on the index, the $4^{th}$ value is selected, which is $TN_{24}$. Referring to the illustrative values in the table 330 from FIG. 3 for exemplary values, the $4^{th}$ value is 304-598-1674. Thus, returning to FIG. 2, the call 232 is set up from the contact center 250 to Called Party B 215 using an ANI of 304-598-1674 as shown.

Accordingly, the process then returns to operation 505 and increments the TN pool index value. Since the value was previously set to 4, the value is now increased to 5. In turn, the next number and corresponding information on the dialing list is retrieved in operation 510 and this time the number retrieved from the dialing list is 702-651-1234.

A determination is then made as to whether the outbound telephone number is a wireless number in operation 515. This time, the retrieved number is a landline telephone number and therefore the process determines the area using the NPA-NXX portion of the outbound telephone number in operation 525. Thus, the process determines the TN 702-651-1234 maps to the area of Nevada in the table and accordingly, determines the TN pool for Nevada is the applicable pool of telephone numbers in Operation 530.

In operation 535, the current TN pool index value of 5 is retrieved and the value is used in operation 540 to select the $5^{th}$ number in the appropriate TN pool. Thus, using table 430, the area of Nevada is assigned to a pool of local numbers, namely $TN_{51}$, $TN_{52}$, $TN_{53}$, $TN_{54}$, $TN_{55}$, . . . and based on the index, the $5^{th}$ value is selected, which is $TN_{55}$. Accordingly, a call is set up from the contact center 250 to the outbound telephone number 702-651-1234 using an ANI showing $TN_{55}$.

Additional Embodiments

The process flow of FIG. 5 represents only one potential embodiment. A number of variations from the above are possible. In one variation, the calling party numbers could be toll free numbers. In another example, different sized pools for each area could be defined all using the same index. If one of the tables reflects a pool of e.g., three numbers (which is less than the maximum value of the index), then an index value of 4 could result in counting in a round-robin fashion until the $4^{th}$ number is reached. Counting in a modulo 3 manner to the $4^{th}$ index value would identify the first number. Thus, the first number would be selected for index values of 1, 4, 7, 10, etc. Similarly, the second number in the pool list would be selected if the index were a value of 2, 5, 8, etc.

In other embodiments, the index value could be selected based on a date, day of week, by random selection using a random number generator, frequency distribution, or other algorithm. For example, the index could be set to 1 for Sunday, 2 for Monday, etc. In another embodiment, the index value could be derived from the current date. For example, if the date were the $25^{th}$ of the month, then the index value could be the sum of the digits, e.g., 2+5=7.

In another embodiment, the index value could be maintained on a per-called party basis. That is, for each called party, a separate index value counter may be maintained. This ensures that for each time a call is made to that called party, the index value is altered. Many other variations will come to mind to those skilled in the art in light of this disclosure as to how the ANI values could be selected from a local TN pool.

The area-to-TN pool mapping table 430 may be populated and maintained by the enterprise on whose behalf the contact center is originating calls for. Specifically, the enterprise may obtain a set of local TNs for various areas and may be responsible for populating the table and uploading the table to the contact center or otherwise make the data available to the dialer 150. The contact center may provide appropriate security mechanisms to allow the enterprise to upload a table of these numbers.

This allows the enterprise to replace the local numbers in the TN pool with new local numbers after a time period. For example, after a year of use, called parties who have been repeatedly called may begin to recognize or block the various local ANI numbers, making it difficult to contact the called party. Replacement or "refreshment" of the values in the TN pool avoids this problem. In one embodiment, the enterprise can upload a replacement data structure to replace the pool of telephone numbers.

If a called party does use the ANI to call back the contact center, the local TN numbers can be forwarded to the contact center, so that even though the number dialed is local, the calls are routed directly back to the contact center. This avoids the called party from incurring long-distance charges.

In another embodiment, the contact center may obtain and manage the table 430 of the TN pool. The contact center may obtain a large set of numbers for each area, and allocate a subset as the TN pool for one enterprise, and then periodically allocate a new subset to each enterprise as a means to refresh the pool of local TNs. In other words, the contact center can manage the local TN pools by swapping sets of local numbers. This allows the enterprise to avoid the responsibility of updating the pool numbers. Of course, when this is done, the forwarding of these numbers to the correct enterprise must also be coordinated.

In another embodiment, the contact center may use the above procedures only in the context of a specific calling campaign. The contact center may originate outbound calls for various enterprises, where the outbound calls associated with each enterprise are associated with a distinct calling campaign. A determination can be made by a processor in the dialer for a particular outgoing call, or for a list of outgoing calls, to determine on a campaign-by-campaign basis whether the selection of the ANI should occur as described above. It is possible for each campaign to have allocated a distinct set of local ANI values to select from. It is possible for a campaign to originate outbound calls to certain states or locales, where calls to each locale is associated with a pool of local ANI telephone numbers, while another campaign does not use the above ANI scrambling procedures. In other embodiments, discussed further below, the ANI value may be altered in order to avoid, or in response to, the ANI being tagged as a robocall.

The contact center may perform ANI scrambling on a batch basis, a per-call basis, or a combination thereof. In the batch basis, a list of records is compiled into a list file, which comprises records for outbound calls to be made by the dialer. The list file can include the list of outgoing telephone numbers to be dialed, and the appropriate ANI can be selected and included into the list file. Thereafter, when convenient, the dialer can then originate the outbound calls after the list is created by examining the records in the list file. The call is originated by the dialer using the ANI indicated in the record.

In another embodiment, the dialer may perform ANI scrambling on a per-call basis, where the ANI value to be selected is determined as the outbound call is being, or about to be, originated. The selection of the ANI on a per-call basis can be used in the scenario where the outbound call reaches a busy or no-answer condition for a user's primary telephone number and a call is then originated to the user's secondary telephone number. The user's secondary telephone number may have a different NPA-NXX than the user's primary telephone number, and performing ANI scrambling on a per-call basis allows the procedures to be repeated when the secondary number is dialed. Another embodiment combines the process in a batch and per-call basis. For example, a list of outbound calls can be generated (which is a batch process) and only when the primary telephone number is unanswered is the ANI scrambling process invoked on a per-call basis when originating a call to the same user on their secondary telephone number. The determination of whether this occurs can be indicated using a flag that defines whether ANI scrambling should be applied to calls to the secondary telephone number.

In another embodiment, the determination for using the address of the called party or the NPX-NXX portion of the outbound telephone number to determine the location of a wireless number could be set as a configurable parameter or determined in real-time. For example, the determination could be based in part on whether an address is known for the called party. For example, if no address is known for the called party, then the NPA-NXX could be used. If the address is known for the called party, then the address could be used instead to determine the area. Other techniques or algorithms could be defined for determining whether to use the area associated with the address or the telephone number.

Exemplary Network Architecture Incorporating Robocall Call Processing

Figure 6:
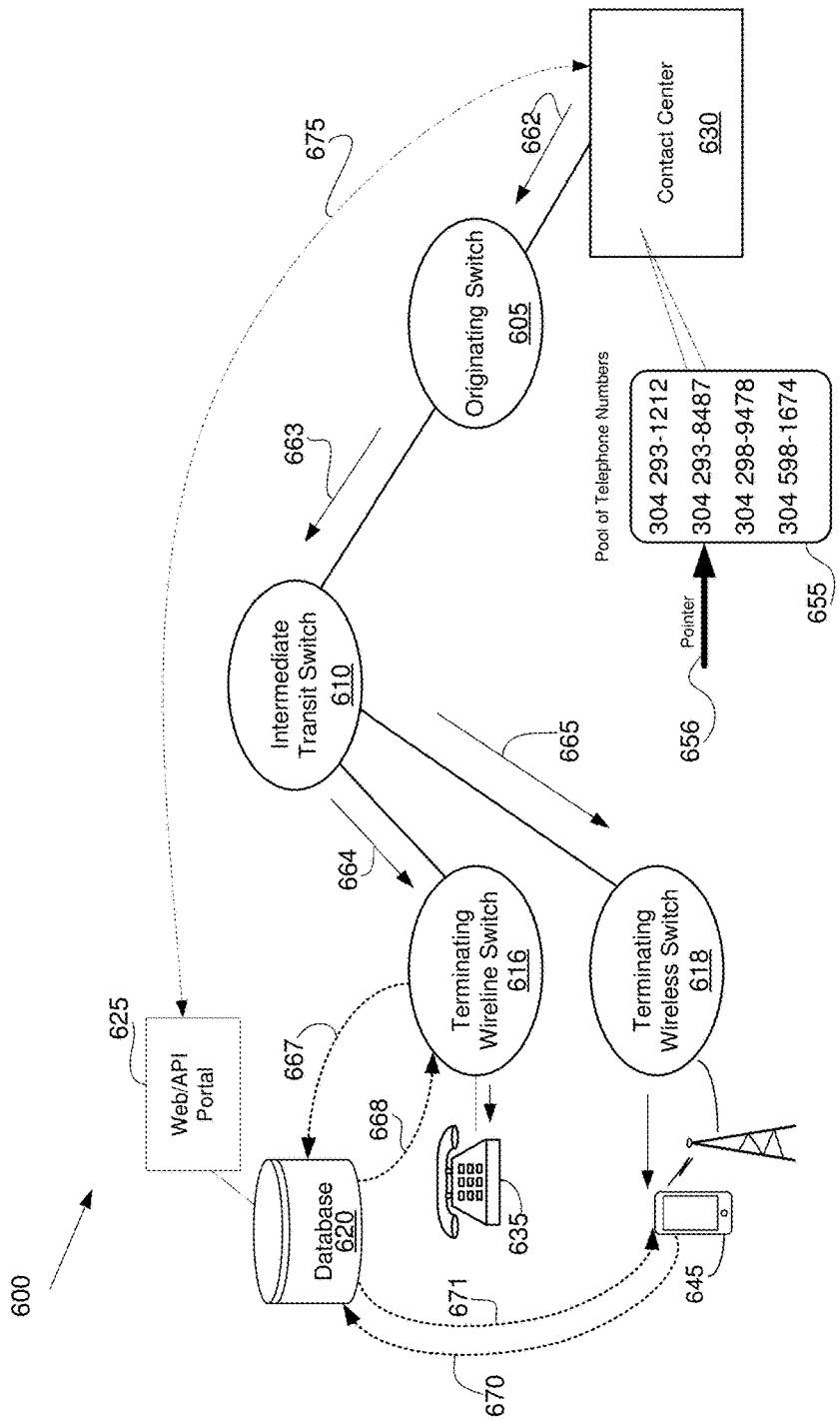
FIG. 6 illustrates one embodiment of a network architecture involving robocall call processing.

One embodiment of a network architecture incorporating robocall call processing ("RCP") functions is shown in FIG. 6. While representing a generic voice switching architecture, the concepts can be readily adapted by one skilled in the art to a particular technology, such as SS7, conventional telephony, VoIP, etc. The process begins with a contact center 630 originating a call. The contact center 630 is shown without any further detail, and could comprise the contact center architecture shown in FIG. 1. The contact center 630 may utilize a pool of telephone numbers 655 that are used as the CPN when originating calls. A pointer 656 or index is used to identify which one of the several numbers in the pool should be used when originating the current call. In this example, the pointer 656 is selecting the second number, (304) 293-8487 in the pool of numbers. Thus, this number is used as the CPN for originating calls.

The call proceeds on a first call leg 662 to an originating switch 605. The originating switch is the switch receiving the call originated by the contact center. The type of voice technology used is not material to the overall concepts. Thus, the switch technology could be a VoIP switch, cable network carrying a voice call, a LAN, a conventional PSTN switch, etc. The call then proceeds on a second call leg 663 to an intermediate transit switch 610. In some examples, there may not be an intermediate transit switch involved. However, for purposes of illustration, it is assumed an intermediate transit switch is involved. At this point, the call may be routed to one of two possible terminating switches. For purposes of illustration, assume the call is routed on a third call leg 664 to a terminating wireline switch 616. The terminating wireline switch may initiate a query 667 to a database 620 (a data store) with the query conveying the calling party number (which is 304 293-8487 in this case). The database will check whether the calling party number (or ANI) is indicated as being a robocall. The definition of a "robocall" varies, but for purposes herein it is presumed to be a voice call originated by a computer that plays a prerecorded announcement to the answering party when the call is answered. As will be evident, the robocall processing procedures may apply to other, non-robocall calls as well, since it is not known when processing a call request whether an announcement is played until the call is actually answered. Thus, the "robocall" label is a presumptive label, regarding whether e.g., a call presumed to be a robocall.

The determination of whether the calling party number is associated with a robocaller or identifies the call as a robocall may occur in various ways. For purposes herein, referring to a calling party number as being "tagged" refers to associating that telephone number, when used as an identifier of the calling party (i.e., when used as the calling party number) as a robocall, or alternatively, as originating from a robocaller. Thus, a "tagged" number is a telephone number used as an identifier of the calling party which has been identified as an alleged robocall or otherwise associated with a robocall tag or indicator of some form. In other words, as used herein, "tagging" a calling party number is equivalent to associating that number with a robocall tag.

The database 620, which may also be referred to as a robocall database, may obtain data from various sources. One source are regulatory robocall complaint databases, which contain the numbers of alleged robocalls. These may include, for example, various Federal Trade Commission ("FTC") and Federal Communications Commission ("FCC") consumer robocall complaint databases. The operator may also collect crowdsourced information, e.g., information reported individually from end users. For example, a mobile user 645 may receive a call that turns out to be a robocall (or a telemarketing call, a scam call, etc.) and the user may report the number to the database 620 using a mobile application. Such mobile apps are readily available for identifying and reporting robocalls. This is another way the database may receive information about the alleged robocall status of a given number.

Once the database 620 receives the query 667 from the terminating wireline switch 616 and determines the corresponding status, it provides a response 668 to the terminating wireline switch indicating whether the number should be offered to the terminating called party or otherwise processed as a robocall. If processed as a robocall, the terminating wirelines switch 616 may block the call from being offered, route it to voicemail, connect it to an announcement player, or route it to an IVR. These are examples of call blocking where the call is not offered to the called party. In other embodiments, the call may be labeled. This involves offering the call to the called party, but in conjunction with displaying a text-based label to the called party associated with the call. For example, if the wireline called party has a caller ID device (such as those used to display calling party name or number), then the information displayed may indicate "spam" or "telemarketer", "scam likely", etc. Thus, with call labeling, the call is not blocked, but offered with information in the form of a label about the type of call, so that the called party may make a more informed decision about whether to answer it.

This same type of processing of receiving a call, querying a database, and either blocking the call or offering it with a label can also occur with a terminating wireless switch 618. Thus, if the intermediate transit switch determines upon receiving the second call leg 663 that the call should be routed to a terminating wireless switch 618, the terminating switch receives the call, performs the query (not shown in FIG. 6) and offers or blocks the call.

In a variation on this call processing, the terminating wireless switch 618 could offer the call to the wireless called party, who may have a smart phone, in conjunction with call labeling. That smart phone could extract the calling party number, initiate a query 671 to the database 620, and receive information back in a response 670 indicating whether the number is a robocall or not. Typically, in such cases, the smart phone has a mobile app that initiates the query, receives the response, and provides a suitable graphical user interface ("GUI") to the user indicating, e.g., the label. This happens so fast that the called user sees an incoming call on their smart phone at the same time that the GUI is indicating whether the call is a robocall or not. Thus, the user may not be able to readily discern whether the smart phone or the terminating wireless switch initiated the query and caused the label information to appear. In fact, both of these embodiments can co-exist in a network. Frequently, from the users' perspective, it may not be a material distinction.

In some cases, the operator of the database 620 may provide access to its data via a web portal 625 that offers an application programming interface ("API"). This web portal 625 may facilitate management and administration of the database, but can also be used by the called party or the contact center originator to check whether a particular number is listed as a robocall and/or what label is associated with it. For example, a contact center originating calls may check whether the calling party number about to be used is listed in the database 620 as being a robocall number i.e., whether the number is tagged. The contact center 630 may be able to initiate a query 675 to the portal 625 to check the status. If a number is listed or tagged as a robocall number, then the call originator can alter the index to select and use a different number from the pool as the CPN.

The call originator may direct the query to one of several potential web portals. It is possible that each terminating service provider may operate its own web portal and associated database. Thus, for example, there may be separate web portals for the major wireless service providers. In other embodiments, there may be a small number (e.g., 3-5) of analytics companies providing the database and associated web portal for a number of carriers. This requires the call originator originating the query to check the status of a calling party number to identify the web portal/database combination to direct the query to. The call originator may maintain address information, such as URLs or URI's of the leading carriers' web portals providing robocall status information. Thus, a call originator knowing that they will be originating calls for customers having wireless telephone numbers on the four major wireless carriers may periodically query each of the four major wireless carrier's portals for robocall status information for the particular calling party number that will be (or is) used.

The capability of checking a number's status may be provided because the database operator may recognize that non-robocall numbers, may from time-to-time, be incorrectly listed in the database and blocked, or incorrectly labeled. This may cause the called party to miss important, legitimate and wanted calls. To avoid this and to increase the accuracy of the database in identifying robocalls, the database operator (which may or may not be a business partner or subsidiary of the terminating carrier) may allow subscribers of the terminating carrier and call originators check the status assigned to a particular calling party number. There are various reasons why a number may be incorrectly listed, including a scammer spoofing the number, which may lead to called parties reporting the number as being from a robocaller. Also, a service provider operating the terminating switch, may detect and count calls and presume that if a calling party number is used too frequently, that it may be part of an robocall campaign and thus tag the number in the robocall database. This may or may not be an accurate determination, and hence it is possible to incorrectly tag the status of a number in the database 620. Thus, the web portal provides a way to check and correct the status information.

The contact center operator may alter the telephone number used from the pool of numbers 655. Thus, the index or pointer may be changed, which has the result of changing the CPN used for originating calls. The basis for determining when to change the index may vary, including in response to learning that the database 620 has "tagged" that number as being a robocall number. The following discussion examines various conditions or criteria that may prompt a contact center operator (or any other form of call originator) to select a different calling party number value or change the index value, causing the same to occur.

Process Flows for Determining when to Alter the Calling Party Number

There are various ways for a call originator to detect when it is time to select (a.k.a. triggering the selection of) a new calling party number from a pool of numbers. Using the same calling party number to originate calls within a short time, particularly if the call volume is large, may prompt a terminating service provider to mark or 'tag' that calling party number as being associated with a robocall label. Thus, any further calls using that calling party number will receive robocall call processing treatment. One way to avoid this possibility is to rotate the calling party number used. That is, to cycle the usage of the CPN to and from the pool of available CPN numbers.

As describe above, one indicator to alter the CPN is to check with a robocall database of a service provider to determine if the number has been 'tagged' as a robocall. If this occurs, it is appropriate to select a new CPN value. Although reference is made to checking with a database (via the above identified web portal), it should be appreciated that multiple databases may have to be checked for different called party numbers, each associated with a different terminating service provider. However, in the case of a single called party number, just one robocall database of the corresponding terminating service provider would be checked, since calls originating to that called number will only be handled by that one service provider. However, a different called number may be served by a different service provider, and thus a different database would have be checked. In practice, there are likely to be a limited number of service providers serving a large proportion of the wireless population. For example, for wireless called party numbers, approximate 90% of the wireless numbers would be served by just four major wireless providers. Further, only the service providers corresponding to the called party numbers in the calling list are relevant. That list may be exclusively served by four or fewer wireless providers. On the other hand, with respect to wireline calling, if wireline numbers are being called within a certain geographical area, then just one or two wireline service providers may be involved.

Another approach is to use a particular calling party number value for a defined number of outbound calls. This involves maintaining a counter for each call originated using a particular calling party number. Once the predefined limit is reached, this indicates that a new calling party number should be selected. Thus, one approach is to define a counter as the criteria for altering the index. This is the approach illustrated in FIG. 7. In a variation of this embodiment, a calling party number counter could be maintained for each terminating service provider. Thus, counters may track that a given CPN was used 500 times with wireless carrier A, 300 times with wireless carrier B, and so forth.

Figure 7:
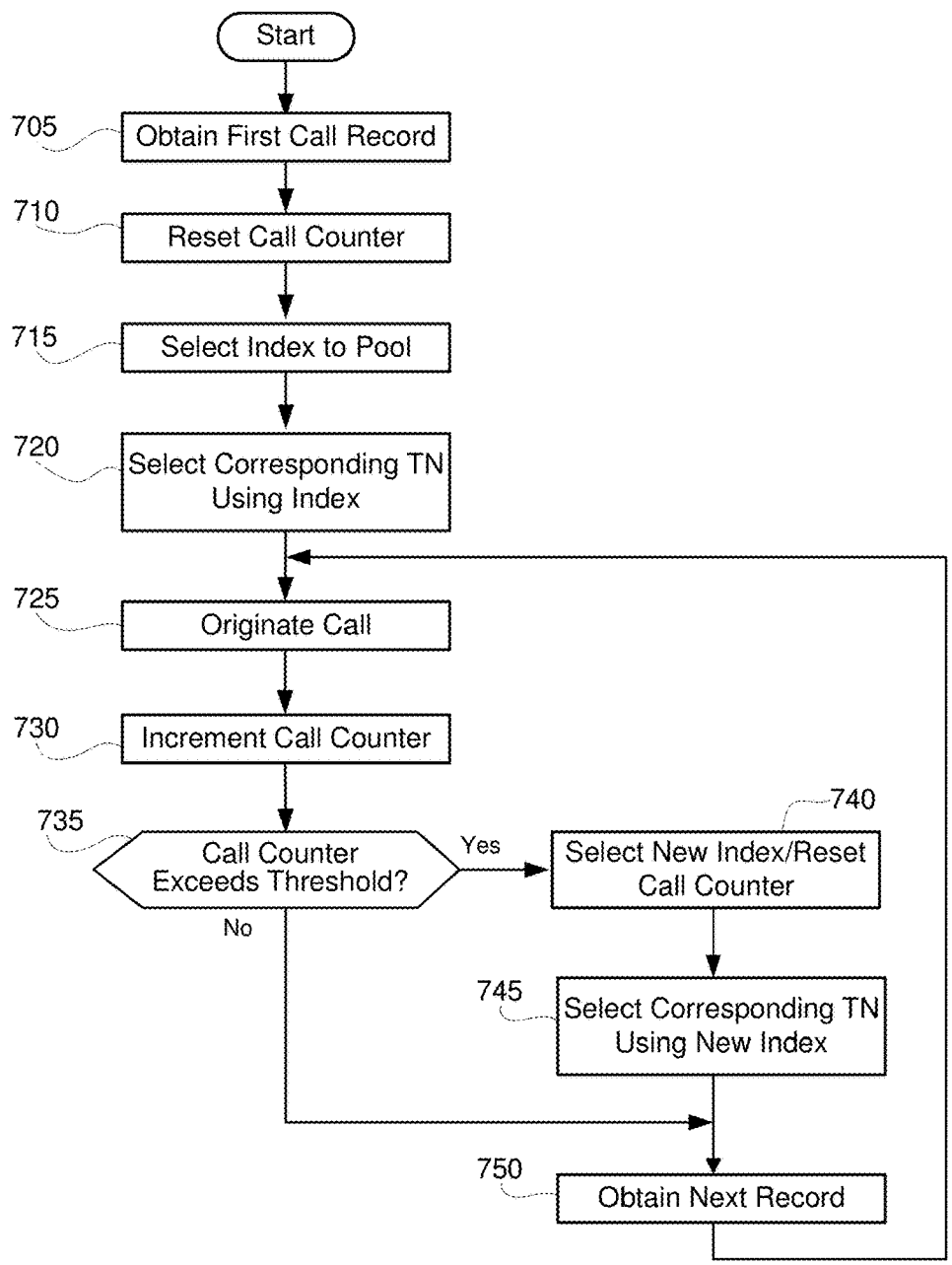
FIGS. 7-12 illustrate various embodiments of process flows that may be associated with determining when to alter the calling party number used for call origination.

Turning to FIG. 7, the process begins with obtaining the first call record in operation 705. Next, after the first call record is retrieved, the call counter variable is reset (e.g., set to 0) in operation 710. Next, an index to a number pool is selected in operation 715, which indicates which calling number is to be used by a process that selects the corresponding telephone number ("TN") as the calling party number in operation 720.

The call is originated using the selected calling party number in operation 725. After the call is originated, the call counter is incremented in operation 730. A test can occur in operation 735 to determine whether the call counter exceeds a particular threshold value. If the threshold is not exceeded, the process continues to retrieving the next call record in operation 750, and the process repeats using the same CPN value.

At some point, as calls are originated and the call counter is incremented, the test in operation 735 will determine whether the counter exceeds a predefined threshold value. Once this occurs, then a new index is selected and the call counter is reset in operation 740. That new index value is then used to select a new corresponding telephone number in the pool in operation 745. The selection of the new index may occur in various ways. For purpose of illustration, it may be that the index is incremented to point to the next number in the list of the pool of numbers. Other embodiments may use other algorithms for selecting the new index value. For example, in one embodiment, a separate counter is maintained for each index value that indicates how many times that index (i.e., the corresponding telephone number in the pool) has been used. That way, when a new index is to be selected, the index that is used the least can be selected. In other embodiments, the new index value could be selected randomly whenever the call counter indicates a new index value is to be used. Obviously, there are number of ways the new index value could be selected. To restate, the call counter indicating how many times the CPN has been used is used to indicate when a new index value is to be selected, but not necessarily which value is to be selected.

Then the next record is obtained in operation 750, and the process repeats. Thus, if the threshold is 100 calls, a selected calling party number will be used for 100 originating calls as the calling party number. Once that number of calls is reached, the index value will be changed which will select a different calling party number, and the counter will be reset. Thus, each calling party number is limited to the number of calls in which it can be used. It is obvious that an appropriate number of calling party numbers should be in the pool set to be used for an appropriate number of calls allowed, otherwise is it possible to run out of calling party numbers for the day's calls. If so, it may be necessary to reuse a telephone number tagged as being a robocall, which may frustrate a purpose of the process flow, which is to avoid using a "tagged" CPN.

Figure 8:
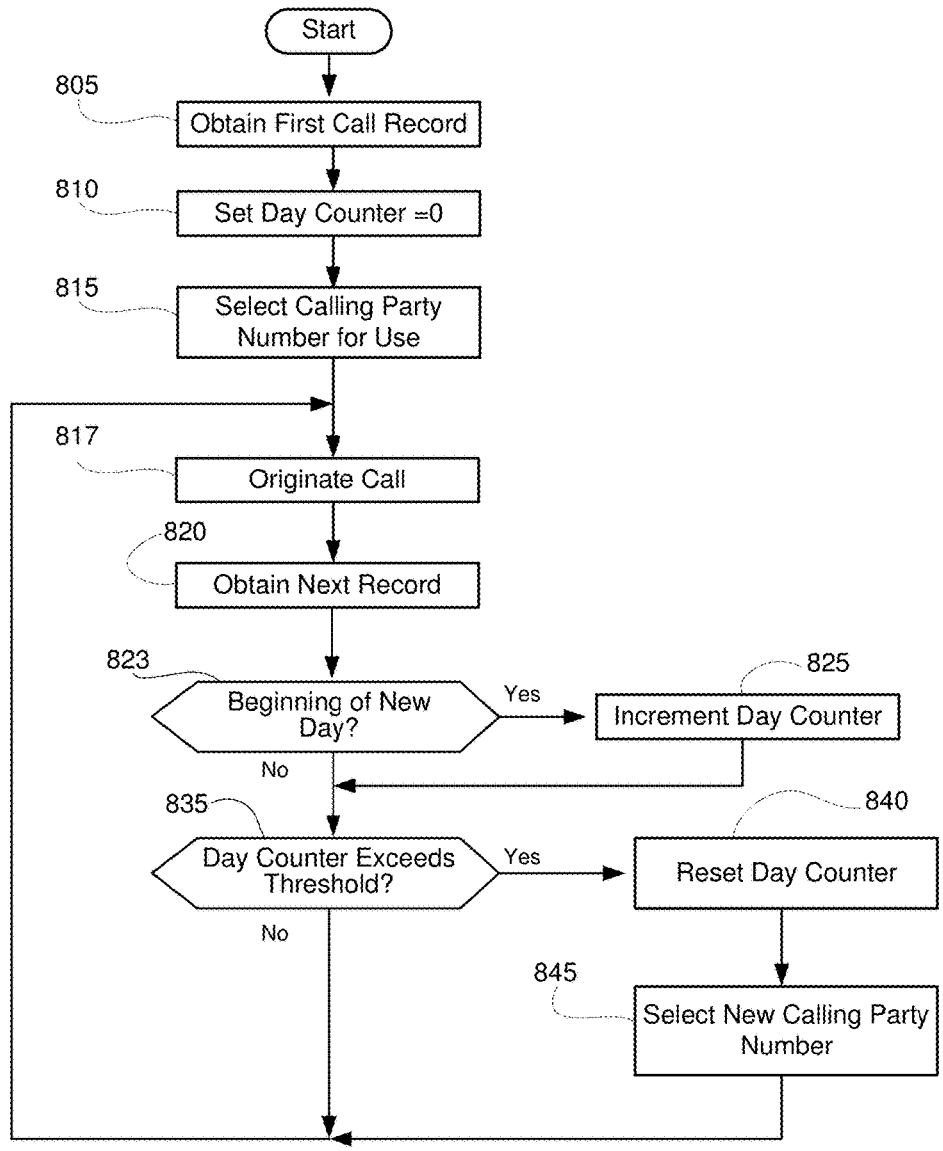

FIG. 8 illustrates another embodiment illustrating how to determine when the calling party number should be changed. Whereas FIG. 7 illustrated using a particular CPN value for a defined number of calls, another possibility is using the calling party number for a limited duration of time. The process begins with obtaining the first call record in a dialing or calling list in operation 805. A counter, called a "day counter" is set to zero in operation 810. The day counter is used to limit the number days that the calling party number may be used continuously, without being changed out. Although a day counter is illustrated, it could be a minute counter, a second counter, an hour counter, or a counter for some other period of time.

Next, a calling party number is selected from the pool for use in operation 815. The call is originated in operation 817 using that calling party number. The next call record is then obtained in operation 820. A test is made whether a new day has started in operation 823. In other embodiments, this could be a test whether a new hour has started, if the counter was set for a number of hours. If a new time period has started in operation 823, then the day counter is incremented in operation 825. The process then continues to operation 835, where a test occurs to see if the day counter exceeds a threshold. If so, the then the day counter is reset in operation 840 and a new calling party number is selected in operation 845. The process then loops back to originating the call using the new record information and the new calling party number information in operation 817.

In this manner, a counter maintains track of a time period, in which the same calling party number is used to originate the calls during that time period. Once that time period limit is reached, a new calling party number is selected, and the counter is reset. Thus, any calling party number will be used for the specified number of days. Again, which new calling party number is selected may vary in different implementations.

Figure 9:
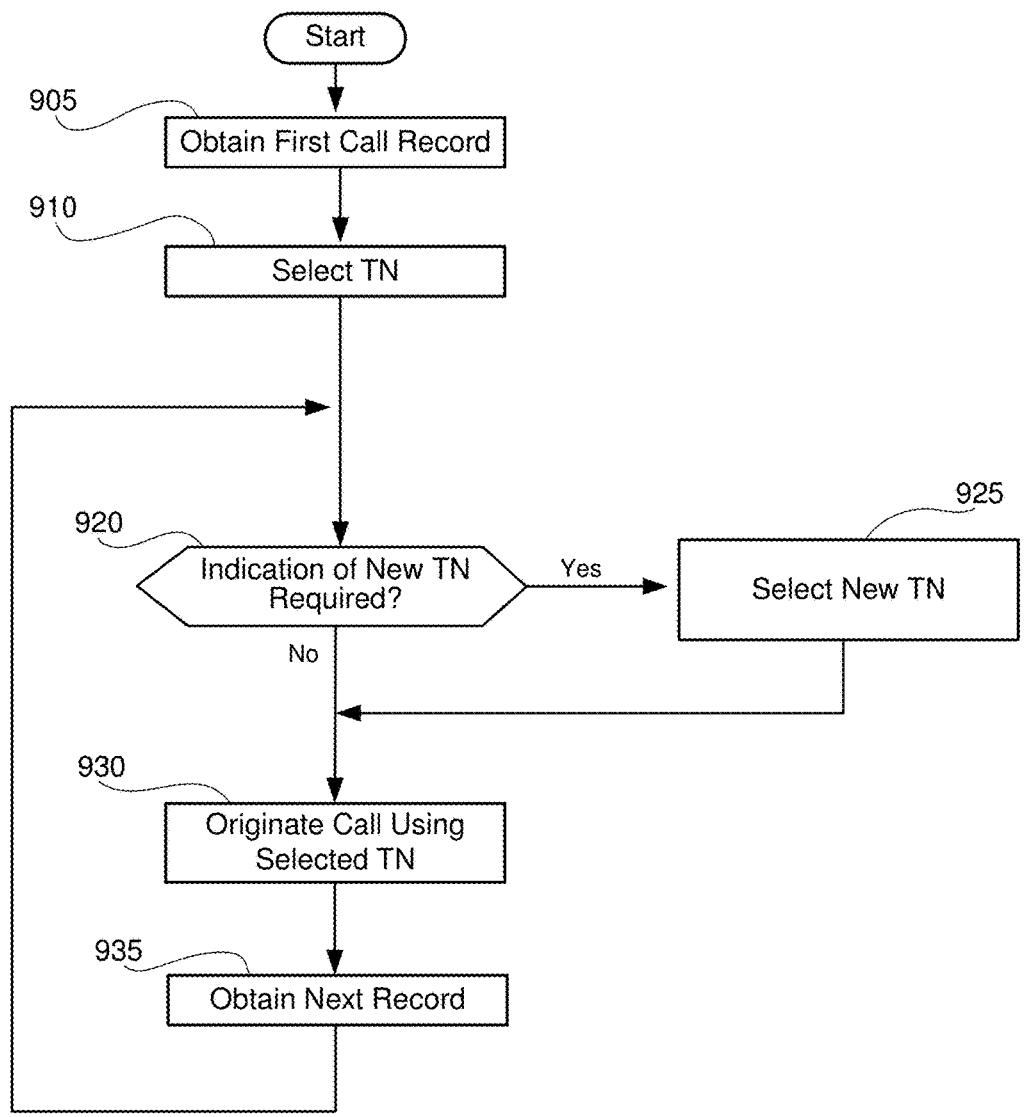

Another indication of when a new index should be selected, thereby causing a new calling party number to be used for call originations, is illustrated in FIG. 9. In this embodiment, a manual indication is received that a new number should be used. In one embodiment, this approach could be used when anecdotal evidence indicates that the current number used as the CPN is "tagged." This could be accomplished in any number of ways, but either an automated or a manual indication is received indicating the currently used CPN should be altered.

Turning to FIG. 9, the process begins with selecting the first call record from a calling list, database, or some other source in operation 905. Next, a telephone number is selected from the pool as the CPN in operation 910. This could be done by selecting an initial index value that indicates which telephone number from the pool to use.

A test is made to determine whether an indication, whether it be manual or otherwise, is received that indicates a new TN should be selected in operation 920. If so, then a new TN is selected in operation 925. The process then continues to operation 930 where a call is originated using the TN. A new record is obtain in operation 935, and the process loops back to operation 920. In this manner, the current telephone number is used until an indication is received that a new value should be selected. Again, a variety of ways could be defined for indicating how the new number is selected.

Another way to determine when to alter the selected value used for the CPN (or, alter the value of the index indicating which value to use as the CPN), is to monitor call outcomes. When the call outcomes crosses a defined threshold, then this indicates a new value should be selected.

Recall that with robocall call processing, calls may be blocked or labeled in some manner. A blocked call will not be answered and a labeled call has a higher likelihood of not being answered. Thus, a call undergoing robocall call processing will likely experience different call outcomes compared to a call that is not undergoing robocall call processing. Specifically, calls treated as robocalls are expected to have lower right party contact rates, higher unanswered rates, higher busy rates, etc. A variety of metrics could be used to measure the call outcome and used to indicate when the CPN value should be changed.

Figure 10:
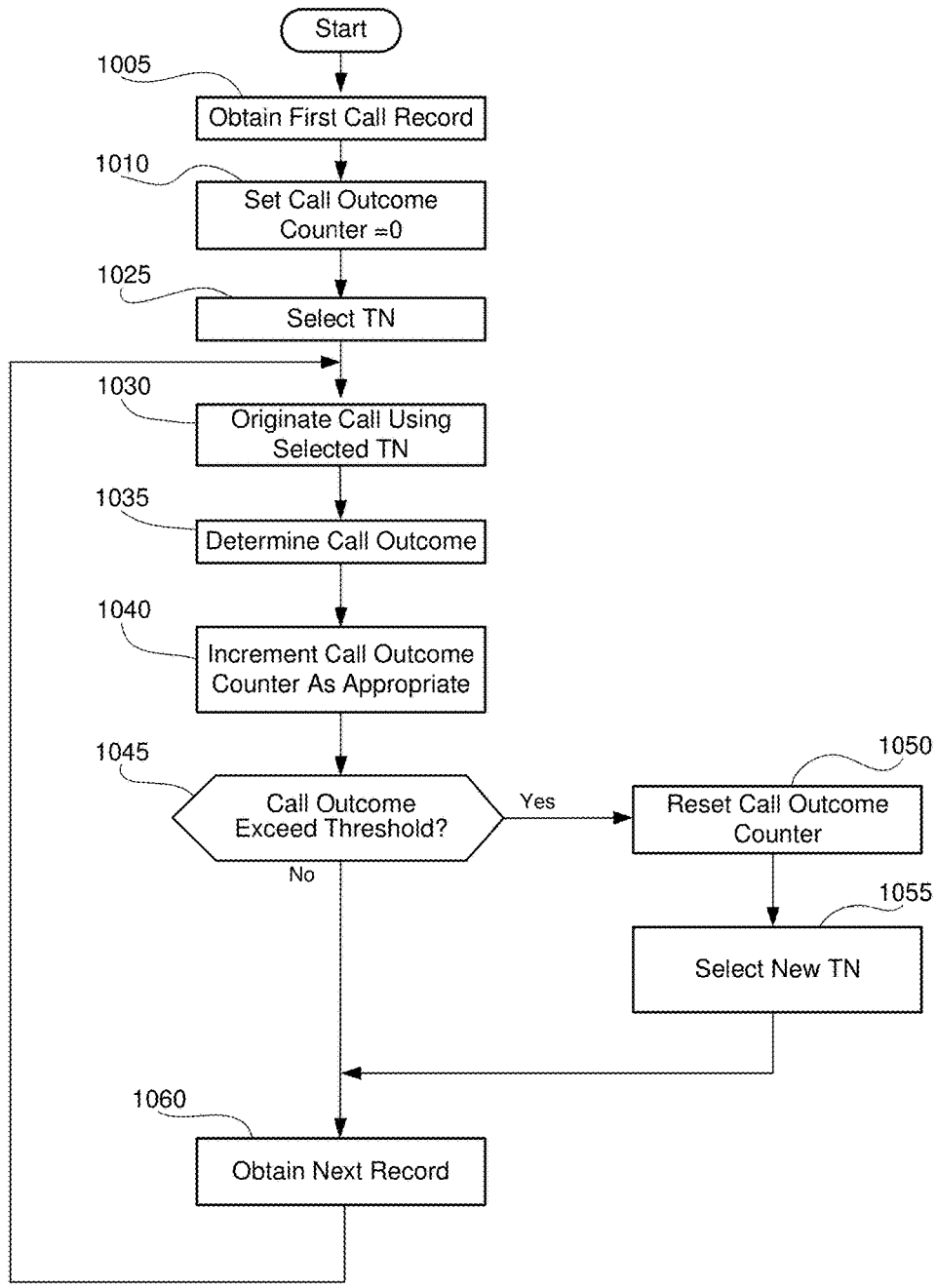

One illustration is shown in FIG. 10. In FIG. 10, the process begins will selecting the first record in the calling list in operation 1005. The call outcome counter is reset to zero in operation 1010. An initial telephone number is selected from the pool as the CPN in operation 1025. The call is then initiated in operation 1030 using the selected telephone number as the CPN.

Next, a call outcome is determined in operation 1035. The call outcome that is monitored may be a busy indication, call completion indication, a right party contact, etc. Whatever the metric(s) used, a call outcome counter is incremented in operation 1040 based on the call.

Next, a test is made in operation 1045 as to whether a threshold is exceeded. Typically, the threshold is determined on a percentage basis, as opposed to an absolute number of calls. For example, if 1000 calls were made, and 10 were determined to be busy, this would represent a 1% rate. On the other hand, if 20 calls were made, then the 10 calls that were busy would represent a 50% rate. Thus, a relative percentage may be more useful in providing a useful result compared to an absolute number of calls encountering that condition.

In other embodiments, a relative percentage may be calculated periodically, e.g., every hour. This may provide a more timely indication that identifies when a number that has been tagged. For example, a 1000 calls may have been made over the last 4 hours, where only 30 have encountered busy. However, that number may have been recently tagged by a service provider as being a robocall and it is now observed that 90% of the calls in the past hour or going forward are reaching a busy condition. Thus, rather than calculate a cumulative rate over the entire day, the rate may be calculated for the last hour or some other time period. In other embodiments, a running average may be produced over a defined number of calls. For example, a running average of the last 50 calls may more quickly identify when the number is tagged as opposed to a running average computed since the start of the day.

If the threshold is exceeded, it may be symptomatic of the CPN being tagged as a robocall number. For example, some service providers may block a CPN tagged as being a robocall and return a busy indication to the call originator. Thus, receiving a high percentages of busy in recent calls may reflect such tagging. Once this threshold is met, then a new telephone number to be used as the CPN is selected in operation 1055. The process then proceeds to obtain the next call record in operation 1060 and the process loops back to operation 1030 where the call is originated with the information from the call record.

In this manner, the new telephone number is selected from the pool (or, a new index is selected) based on a call outcome condition. The monitoring of the call outcome condition may occur in various ways and may monitor various outcomes, but once the threshold is exceeded, then this triggers the selection of a new telephone number to use as the CPN for outbound calls.

Figure 11:
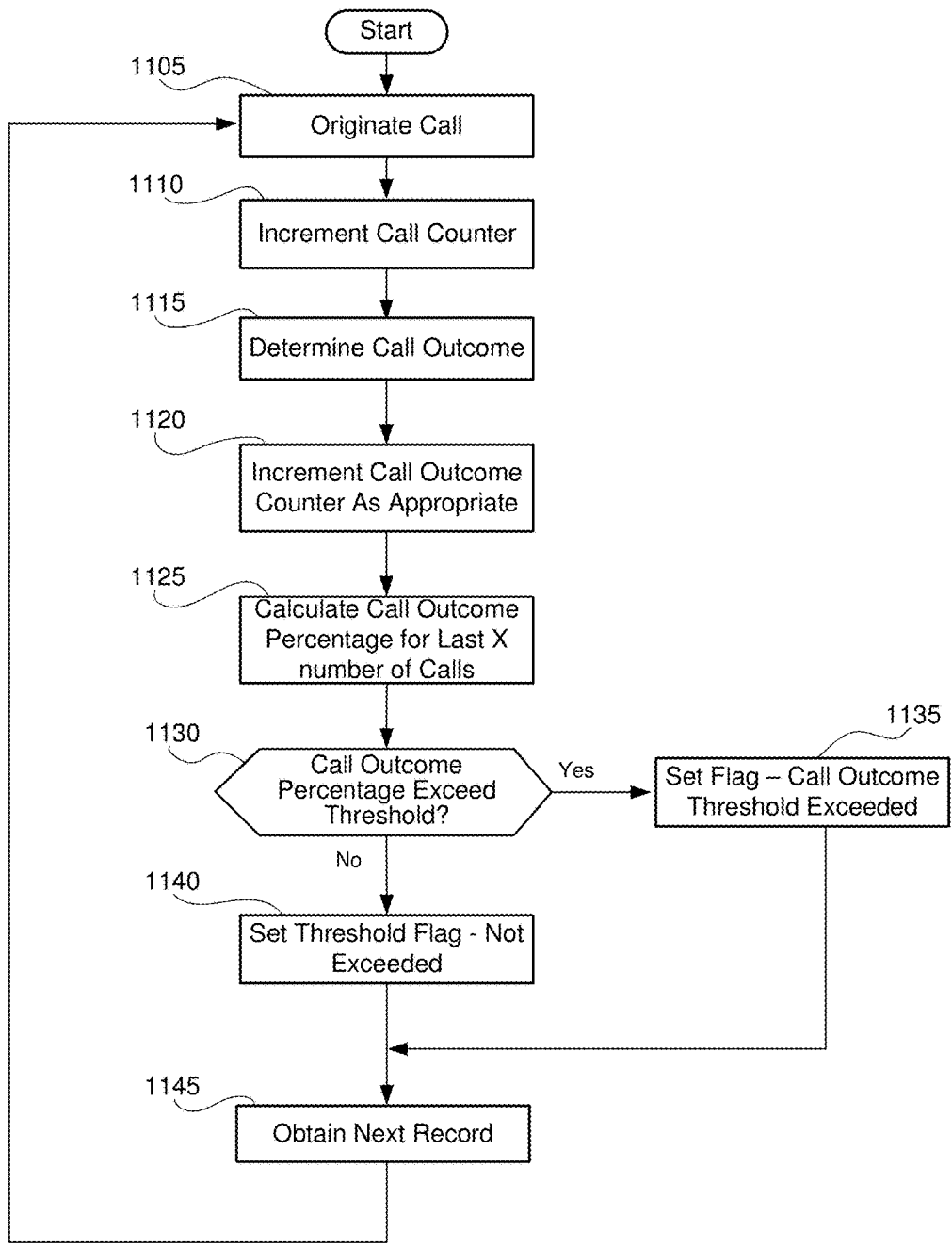

FIG. 11 is another variation of the call outcome process flow, but which defines how to determine when a call outcome threshold is exceeded. In this embodiment, the process begins with originating a call in operation 1105, incrementing the call counter in operation 1110, determining the call outcome in operation 1115, and incrementing an appropriate call outcome counter in operation 1120. Next, a call outcome percentage is calculated for a specific number ("X") prior calls in operation 1125. If this exceeds a percentage threshold in operation 1130, then a flag is set in operation 1135, otherwise the flag is set to "not exceeded" in operation 1140. Then a next record is obtained, and the process loops back and begins again. Thus, the process flow of FIG. 11 can be used to determine how the determination can be made in operation 1045 of FIG. 10, as to how it can be determined the call outcome limit is exceeded.

Another approach for triggering the selection of a new telephone number as the CPN involves a per-call or periodic query to a robocall database by the contact center using the currently selected CPN. A query can be made to one or more databases that contain information about telephone numbers that are identified in some manner as robocalls or otherwise associated with a robocall tag. The contact center could perform a query prior to each call origination, or perform a periodic query, or after a certain number of calls. A process flow showing how the check could be performed before each call is shown in FIG. 12.

Figure 12:
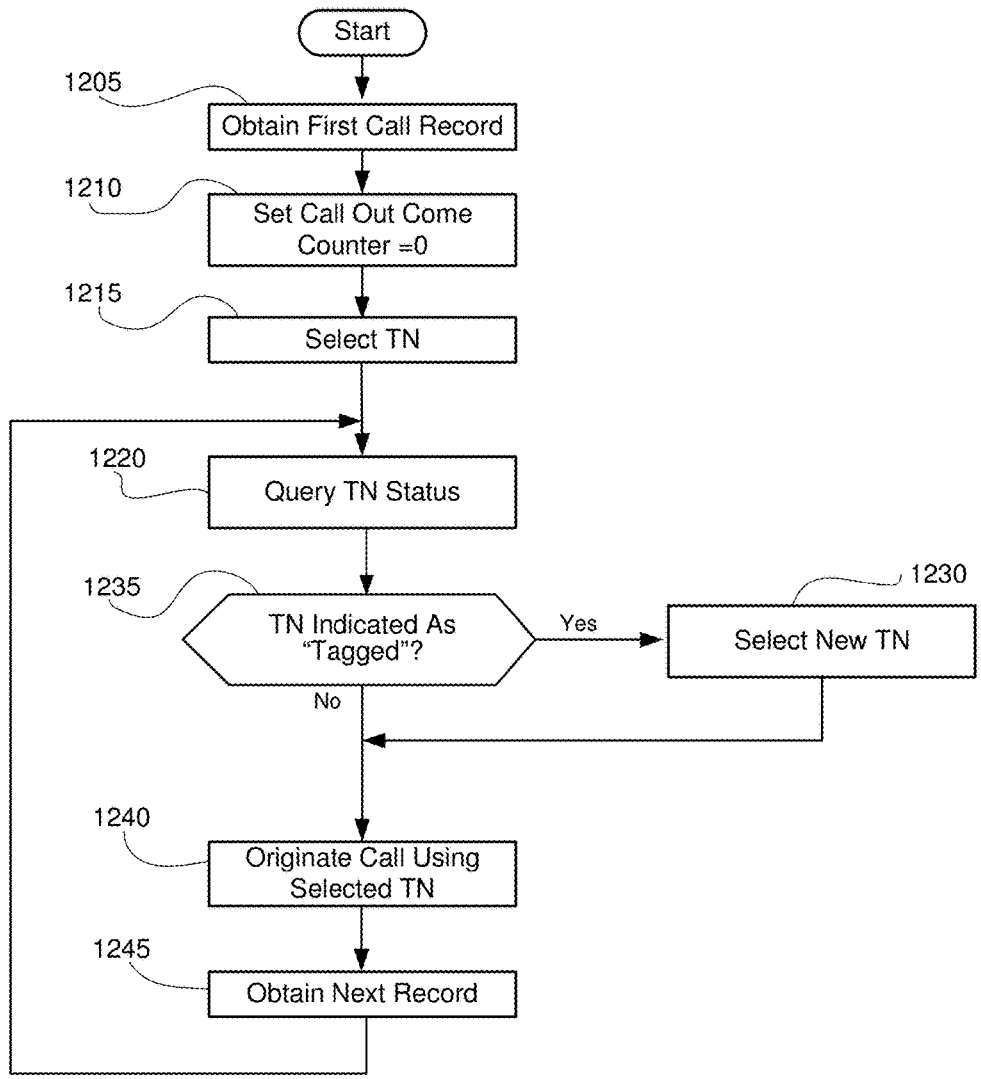

Turning to FIG. 12, the process begins by retrieving the first call record in operation 1205. The call outcome counter is reset, i.e., set to zero in operation 1210. Next, a telephone number is selected for use as the CPN in operation 1215. Next a query is made regarding the status of the selected number in operation 1220. This may involve, e.g., the contact center 630 sending a query 675 to the web/API portal 625, which communicates with the robocall database 620 regarding the status of the indication number.

If the results of the query indicate the number is unacceptably "tagged" in some manner, then a new telephone number is selected as the CPN for originating calls in operation 1230. The process then continues by originating the call using the currently selected telephone number in operation 1240. The next record is obtained in operation 1245, and the process repeats back to operation 1220, where a query again is launched.

Thus, in this process flow, the status of the CPN selected is checked before each outbound call. In other embodiments, the check may occur every other call, or a specific number of call, or based on a time period, such as every five minutes or each hour. This would avoid having to maintain call counters, and the frequency at which a query to the appropriate databases is made allows the contact center operator to define the delay at which a 'tagged' number is detected. That is, the more frequent the query is made, the shorter the delay at which the condition may be detected.

Calling Party Number Status

A contact center operator may maintain a pool, or a plurality of pools of numbers, from which to select the calling party number when originating a call. The size of each pool may vary. For example, a calling campaign may have a number of pools, each of which is associated with a geographical region, and each number in the pool may have data associated with it as to how frequently that number has been used.

Any number in a pool can be considered as having one of a number of states. The pool is the collective set of numbers in each of the various states shown in FIG. 13. In the context of robocalling, however, a number may have an additional state (compared to other contexts disclosed herein), where a particular CPN may have been "tagged" as being a robocall. Thus, numbers associated with a robocall tag should be avoided for use, particularly if there are 'untagged' numbers in the pool available for use. Furthermore, some service providers will 'tag' a telephone number as being a robocall of a certain type, but may 'untag' that number with the passage of time, if no further reports are received.

Figure 13:
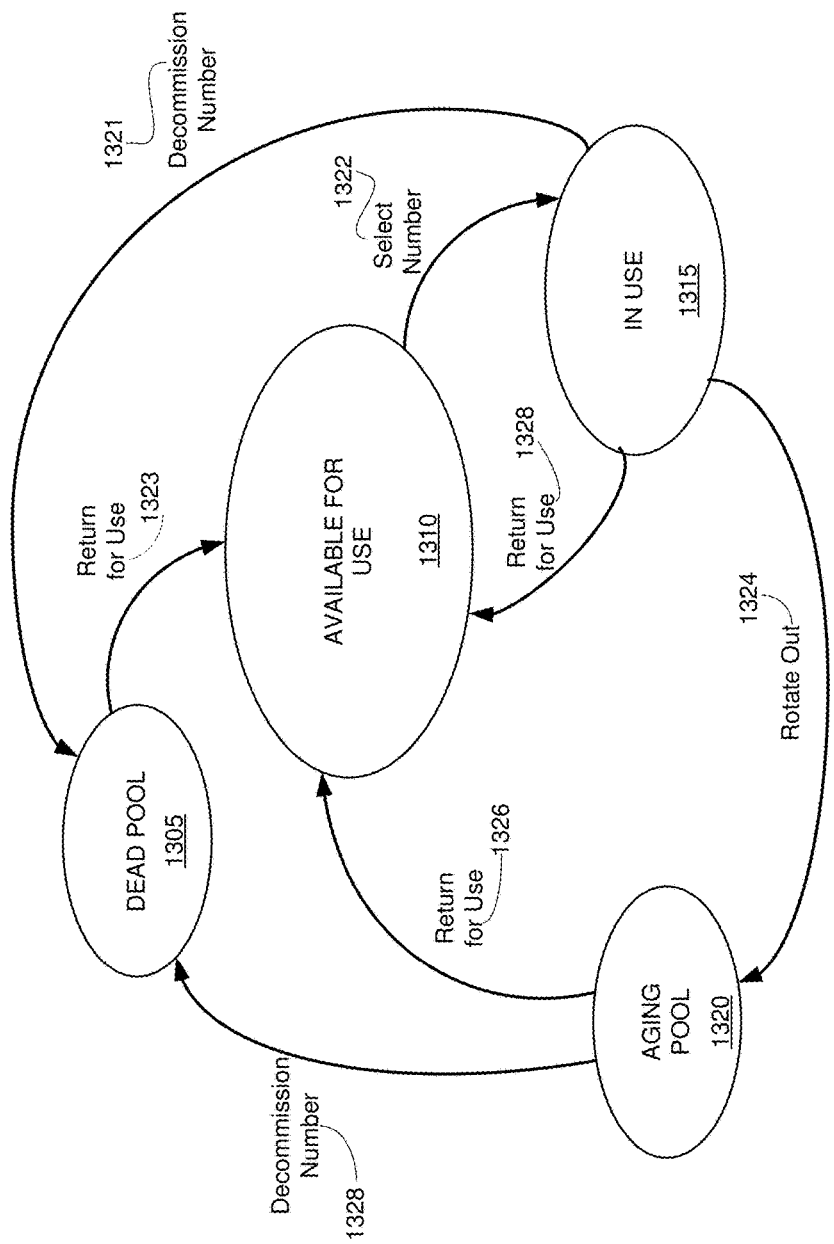
FIG. 13 illustrates a state diagram of the various states that a calling party number may be associated in with respect to its use for originating calls in a calling campaign.

An illustration of the various states a number may be in, is shown in FIG. 13. The main state is Available for Use 1310, which represents a number that has not been tagged. It can be selected for use with a Select Number action 1320. Once selected, it is moved to the In Use state 1315. In this state, the number is being used as the calling party number in originating calls. Once in this state, two possible actions can occur. The number may become "tagged", in which case the number is decommissioned via a Decommission Number action 1321. It is then placed in a Dead Pool state 1305, which comprises tagged numbers. These numbers should not be generally used. Alternatively, if the number is in the In Use state 1315, the number may be retired from use, so as to avoid the number from being tagged. This is accomplished via a Rotate Out action 1324, which places the number in an Aging Pool state 1320. The Aging Pool state represents numbers which have been recently used, and should be 'aged' a while before returning to being available. It can also be thought of as an "unavailable for use" state. A Return to Use action 1326 places the number back into the Available for Use state 1310.

It is possible that a number in the Aging Pool state 1320 may be queried as to its status before it is placed back into the Available for Use state 1310. The query may return information indicating that the number has been tagged, and if so, the Decommission Number action 1328 places that number in the Deal Pool state 1310.

Any number in the Dead Pool state 1305 may be restored to use. The appropriate time may be discovered by periodically querying the status of each number in the Dead Pool state 1305. If it is discovered that the number is 'untagged', then the Return to Use action 1323 restores that number for availability by placing it back in the Available for Use state 1310.

It is possible that a number in the In Use state 1315 could be directly placed back into the Available for Use state 1310. In fact, in the context of rotating numbers based on a geographical basis, this particular action may be invoked to accomplish the goal of placing the number back in to the Available for Use state. However, if it is desirable to let a number age before using it again, the Rotate Out action 1324 will place the number, for a defined time period, back into the Aging Pool state 1320. This allows number to be 'rested' or aged before using the number again, which may contribute to avoiding the number from being labeled as a robocall. Some service providers utilized algorithms that weigh the frequency of use of the CPN as the basis for tagging that number, and hence letting the number age decreases the likelihood of that number being tagged.

In some embodiments, the numbers in a pool may be defined for a geographic area. Returning e.g., to FIG. 3, there may be separate pools 310, 320, 330 for Area 1, Area 2, and Area 3, wherein each number therein may have one of the specific states associated to it as shown in FIG. 13.

The change in a number's state is defined by the corresponding action. For example, the action "Select Number" 1322 retrieves an eligible number having an Available for Use state. For purposes of illustration, each of the states could be considered as a "sub-pool." For example, the numbers having an Available for Use state could be considered as being in the Available for Use sub-pool.

The algorithm for which number is selected via the Select Number action may vary in different embodiments. Each number in the Available for Use sub-pool may have metadata indicating aspects of its prior use. It may have metadata indicating how many calls it was used with in the last hour, or how many times for the current day. The selection of the new CPN to use may be based on selecting the number in the pool with the lowest number of uses. Or, other metrics may indicate for how many minutes the number was used, and the selection criteria may be to select the number with the fewest number of minutes of use. Or, the metric may indicate a particular order of that number with all other numbers, and the order is used to select the number from the Available For Use sub-pool.

The placement of a number from the In Use state to the Aging Pool state is performed by the Rotate Out action 1324. As discussed earlier, a number of conditions can cause a number to be rotated out. If a call counter, call outcome counter, or timer exceeds a threshold value, that may cause the CPN to be rotated out, and a new value selected. Similarly, if the results of a query to a robocall database or other input to the system indicates the number is tagged, that may cause the number to be decommissioned via Decomission Number action 1321. The point is to illustrate that how each of the actions occurs may vary in different embodiments, even though the results of the action is the same. For example, regardless of how the algorithm selects a number for use, the number is used for originating calls. Or, regardless of how a number in use is determined to be no longer used, it is placed into the Aging Pool state.

Number and Carrier Specific Information

Figure 14:
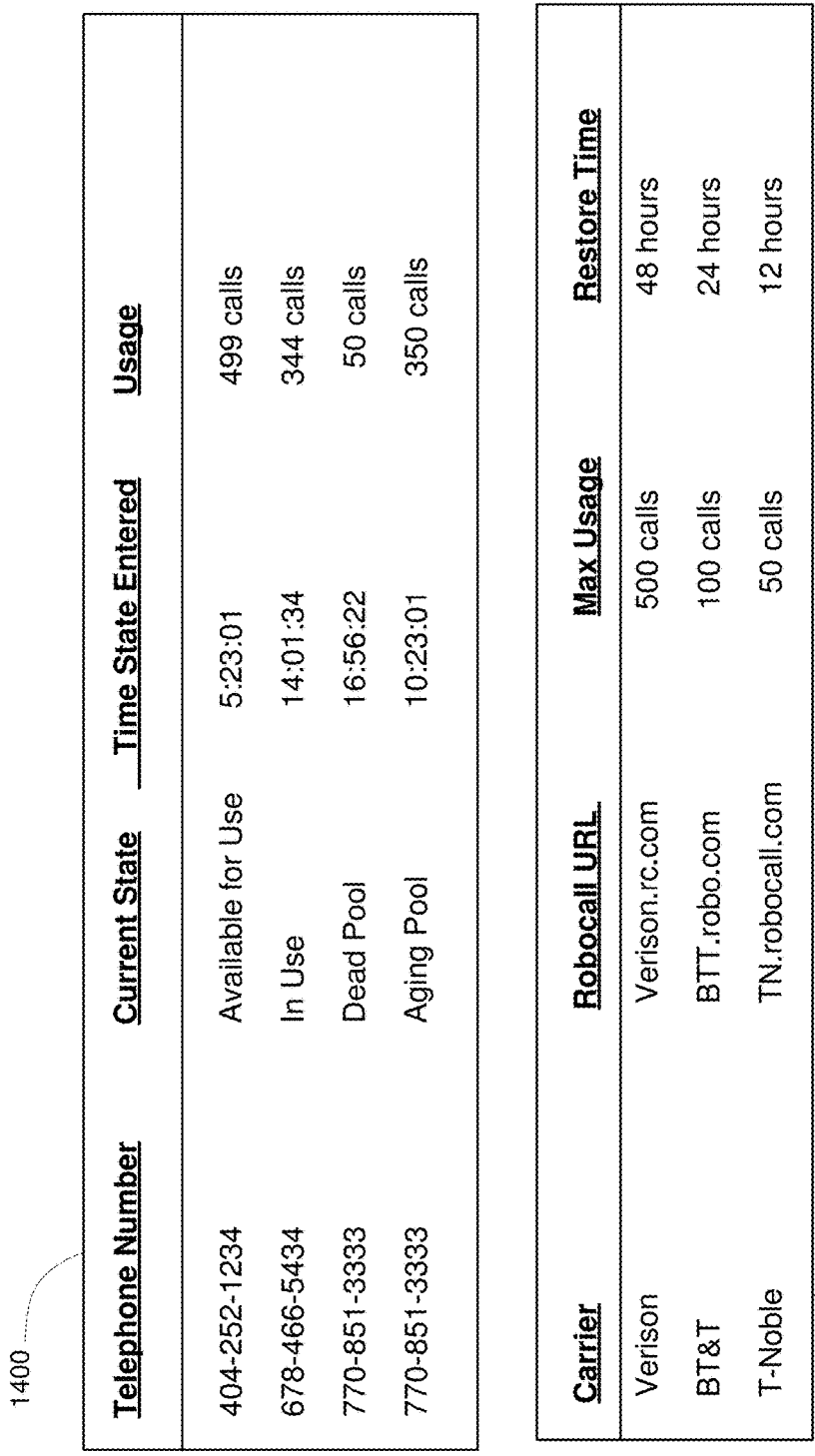
FIG. 14 is an exemplary data structure of various meta-information that may be maintained related to the calling party number.

The contact center may maintain meta-data specific to a telephone number relative to its use as a CPN, as well as robocall related information for a specific service provider (carrier). The data structure in FIG. 14 can illustrate possible information that is maintained. The data structure in FIG. 14 is illustrative, and is not intended to limit the actual data structures used, nor what data is maintained.

The CPN meta-data table 1400 indicates data associated with the state and usage of a telephone number in a pool. This indicates a relative small pool of four numbers, but which is sufficient to illustrate the principles. Each number has an associated state indicated with it, and a time when that state was entered. This allows a computation of how long that the number has been in that state. Thus, if there are multiple numbers in the Available for Use state, the number being in that state for the longest time can be selected. Further, the last column indicates how many calls have been originated using that number. This counter could be used in determining how many times the number should be used in a given time period. From this table, it can be ascertained the state of each number and the table can be updated whenever the state of a number changes.

The carrier robocall table 1410 maintains information about a carrier. For purposes of illustration, it is show as having three carriers, though in practice, there may be more. Each carrier has an associated robocall database URL or other address information indicated, which the contact center can query to see the status of each of the telephone numbers in the CPN meta-data table 1400. Further, information is maintained, to the extent it is known, of how many calls that carrier allows before a telephone number is tagged, and how long it will be tagged before it will be restored. This provides the contact center with information about the degree that a CPN may be safely used before it should be placed in the Aging Pool state. In other embodiments, other types of parameters may indicate how long it takes a carrier to tag a call, and the illustration of the maximum allowed call usage is only exemplary. There may be various parameters used by different carriers in determining when to tag a call.

A call originator has flexibility in how the robocall status information can be obtained and used. Recall that the call originator may check a variety of databases from a variety of carriers in order to ascertain the status of a number being used to originate calls. A specific example can illustrate this. A call originator may originate calls of a certain type (e.g., appointment reminders) to a number of called parties. These appointment reminders may be centered in a particular town or city. The call originator may segregate the numbers to be called into two lists—one for wireline numbers and another for wireless numbers. The call originator may know that in the geographical area of the called parties (e.g., the city or town), that there is only one major wireline telephone provider. Thus, the call originator knows that for all the called wireline numbers, only one robocall database has to be checked. The call originator may use a particular strategy of checking whether a calling party number has been tagged (examples of such strategies were discussed in conjunction with FIGS. 7-12). For the wireline numbers to be called, the call originator may check the status once, at the beginning of the day, prior to processing records in the calling list. If the number status is acceptable, then all the calls to the wireline numbers may be made without any further periodic checking or using thresholds, counters, or other means.

The call originator may surmise that wireline numbers are less likely to be reported as a robocall, for various reasons. First of all, the called parties with wireline number typically will have a conventional wireline telephone of some form. Such a telephone device may not readily facilitate the reporting of a calling party telephone number as a robocall. That is, the called party may have to initiate a separate call to their service provider's customer service line to report that calling party number as a robocaller. Or, the called party may have to log onto their service provider's website to report that calling party number as a robocaller. Thus, the called party on a wireline phone may be less apt to report a number as a robocall, and simply hang up the phone without taking further action.

On the other hand, in the majority of cases where a smartphone is involved with call labeling, the mobile application has a capability for the user to report a call as a robocall. This can be often performed by the user with minimal effort. The user can simply select a function key presented to them to report the current call as a robocall. Thus, a wireless caller may be more apt to report a call as a robocaller.

This may impact the call originators strategy as to when they check the number's status. The call originator may check the status for each call as the calling list is being processed. Or, the call originator may check the status periodically for each of the major carriers as the calling list is processed. Further, the call originator may decide that a number is tagged with respect to all wireless carriers as soon as any one of the four major wireless carriers tags the calling party number. Thus, the call originator may replace the calling party number on all wireless calls made to any wireless carrier as soon as one reports it is tagged.

In another variation, the call originator may instead replace the calling party number on a selective basis. For example, the call originator may maintain carrier information for all the wireless numbers to be called. Then, after calls are originated to the wireless numbers, once a specific wireless carrier tags a calling party number, then a new calling party number is used only for those called party numbers associated with that wireless carrier. Because the other carriers have not yet tagged the calling party number, calls may originate using the same CPN to called parties that are associated with those other carriers. However, this approach requires the call originator to track the status and manage the calling party number on a per-wireless carrier basis, which may be more difficult to manage. Doing so on an individual carrier-specific basis also allows the call originator to adapt to different levels of aggressiveness that a carrier may employ in tagging robocalls. For example, as noted in FIG. 14, some carriers may have different thresholds as to call limits which their algorithms may employ before tagging a calling party number as a robocall.

Thus, there may be a compelling reason for a call originator to segregate a calling list into a wireline sub-list and wireless sub-list of numbers. Alternatively, a list of integrated numbers can distinguish for each record, whether the called number is wireline or wireless. Then, the call originator may utilize a separate strategy for determining when the calling party number has been tagged. It is possible that for wireline numbers, monitoring for a tagged calling party number may be done not at all, done once, or done periodically with a low frequency (e.g., every few hours). On the other hand, call originator may employ a more aggressive monitoring strategy for wireless numbers, such as monitoring the use of the CPN more frequently, for each call, for each number of X calls, for each X minutes, etc. Furthermore, the call originator may simply replace the calling party number periodically, prior to it being reported as being tagged. Still further, the call originator may replace the calling party number for all calls to any wireless number once any one wireless carrier reports the calling party number as tagged.

Exemplary Computer Processing Device

Figure 15:
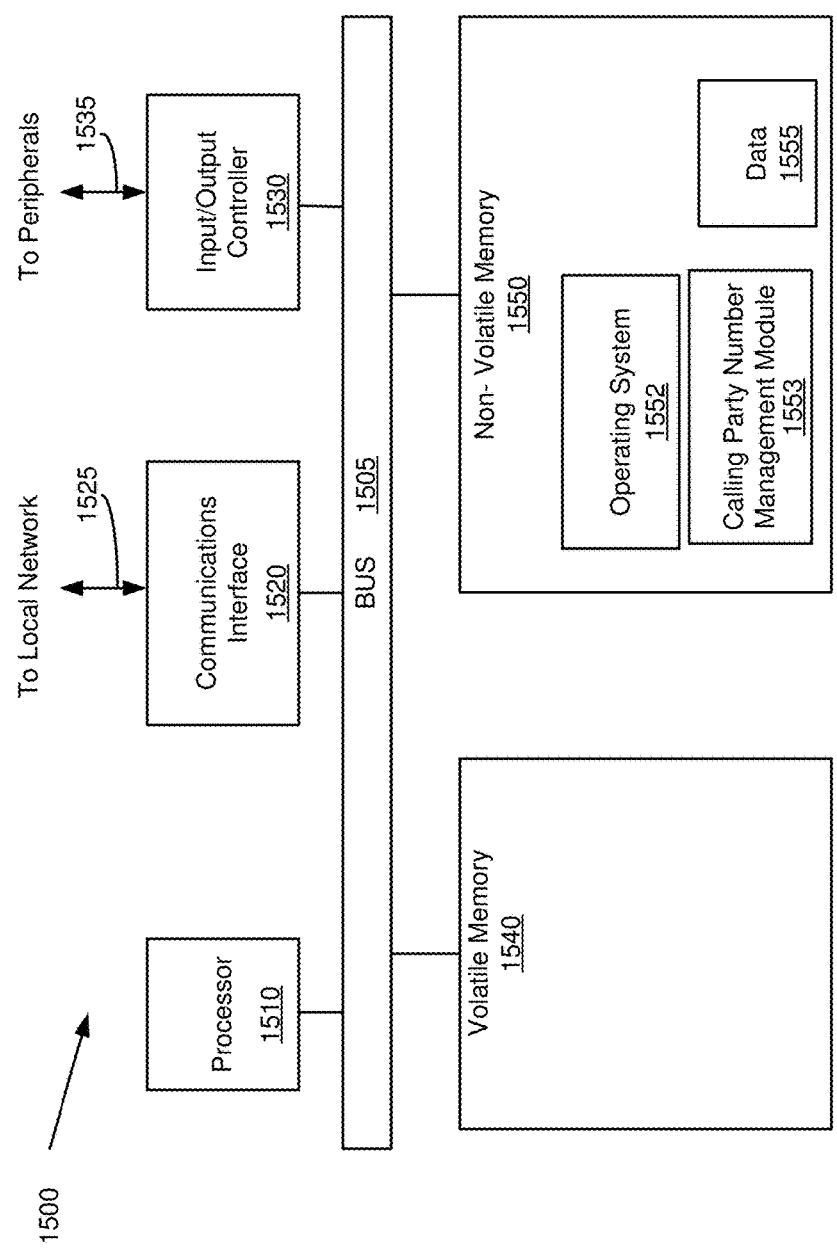
FIG. 15 is an exemplary schematic diagram of a processing system used in one embodiment of the contact center architecture to practice the technologies disclosed herein.

As discussed in conjunction with FIG. 1, the contact center architecture 100 may comprise various components, such as servers, that comprise a processing system. FIG. 15 is an exemplary schematic diagram of a computer processing system that may be used in an embodiment of the contact center architecture to practice the technologies disclosed herein. FIG. 15 provides an exemplary schematic of a processing system 1500, which could represent individually or in combination, for example, the ACD 130, CTI server 145, WFM server 155, agent computer 160a, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 15, the processing system 1500 may include one or more processors 1510 that may communicate with other elements within the processing system 1500 via a bus 1505. The processor 1510 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. The processing system 1500 may represent a dialer, in which the processor(s) manages the use of the calling party number as disclosed herein.

In one embodiment, the processing system 1500 may also include one or more communications interfaces 1520 for communicating data via the local network 170 with various external devices, such as other servers of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1530 may also communicate with one or more input devices or peripherals using an interface 1535, such as, but not limited to: a keyboard, a mouse, a touch screen/display input, microphone, pointing device, etc. The input/output controller 1530 may also communicate with output devices or peripherals, such as displays, printers, speakers, headsets, banner displays, etc.

The processor 1510 may be configured to execute instructions stored in volatile memory 1540, non-volatile memory 1550, or other forms of computer readable storage media accessible to the processor 1510. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1550 may store program code and data, which also may be loaded into the volatile memory 1540 at execution time. Specifically, the non-volatile memory 1550 may store one or more Calling Party Number Management modules 1553 and/or operating system code 1552 containing instructions for performing the process and/or functions associated with the technologies disclosed herein. The Calling Party Number Management module 1553 may also access, generate, or store data 1555 in the non-volatile memory 1550, as well as in the volatile memory 1540, as necessary in order to perform the various number management functions disclosed herein. The data 1555 may include the above references tables and index values. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1510. These may form a part of, or may interact with, the Calling Party Number Management module 1553.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation. None of the claim terms are intended to be interpreted in a "mean-plus-function" form, that is, according to 35 U.S.C. § 112(f).

The invention claimed is:

1. A system for selecting calling party telephone numbers for outgoing calls, the system comprising:
   a memory storing:
      a calling list comprising a plurality of call records;
      a pool comprising a plurality of calling party telephone numbers; and
   at least one computer processor in a dialer configured to:
      retrieve a first called party telephone number in a first call record in the calling list for a first outgoing call;
      originate the first outgoing call directed to the first called party telephone number using a first calling party telephone number from the pool to indicate a first caller-ID for the first outgoing call;
      retrieve a call outcome metric comprising call outcome information of prior calls originated using the first calling party number;
      determine the call outcome metric exceeds a threshold level;
      in response to determining the call outcome metric exceeds the threshold level, associate a robocall tag with the first calling party number in the memory reflecting the first calling party number is unavailable for use in originating calls;
      select a second calling party telephone number from the pool after determining the call outcome metric exceeds a threshold level;
      retrieve a second call record comprising a second called party number from the calling list for a second outgoing call; and
      originate the second outgoing call based using the second calling party telephone number.

2. The system of claim 1, wherein the at least one computer processor is further configured to:
   determine the call outcome metric does not exceed the threshold level;
   in response to determining the call outcome metric does not exceed the threshold level, select a third call record comprising a third called party number from the calling list for a third outgoing call; and
   originate the third outgoing call based using the second calling party telephone number.

3. The system of claim 1, wherein the threshold comprises a counter measuring prior calls encountering a busy condition and the at least one computer processor is further configured to:
   increment the counter in response to the first call reaching the busy condition.

4. The system of claim 1, wherein the threshold reflects an answer rate for prior call originations, and wherein the call outcome metric exceeding the threshold level reflects the answer rate dropping below the threshold level.

5. The system of claim 1, wherein the at least one computer processor is further configured to:
   modify the call outcome metric in response to a call outcome of the first outgoing call.

6. The system of claim 1, wherein the at least one computer processor is further configured to:
   reset the call outcome metric after selecting the second calling party telephone number from the pool.

7. The system of claim 1, wherein the at least one computer processor is further configured to:
   modify the robocall tag after a defined time period to reflect the first calling party number is available for use.

8. The system of claim 1, wherein the at least one computer processor is further configured to:
   set the robocall tag to one of at least two values comprising a first value and a second value, wherein the first value indicates the first calling party number is available for use for call originations and the second value indicates the number is unavailable for use for call originations.

9. The system of claim 1, wherein associating the robocall tag with the first calling party number in the memory causes the first calling party number available for usage in call originations.

10. A non-transitory computer readable medium storing instructions that when executed cause one or more computer processors to:
    retrieve a first called party telephone number in a first call record from a plurality of calling records in a calling list for a first outgoing call;
    originate the first outgoing call directed to the first called party telephone number using a first calling party telephone number from a pool comprising a plurality of calling party telephone numbers to indicate a first caller-ID for the first outgoing call;
    retrieve a call outcome metric comprising call outcome information of prior calls originated using the first calling party number;
    determine the call outcome metric exceeds a threshold level;
    in response to determining the call outcome metric exceeds the threshold level, associate a robocall tag with the first calling party number in a memory reflecting the first calling party number is unavailable for use in originating calls;
    select a second calling party telephone number from the pool after determining the call outcome metric exceeds a threshold level;
    retrieve a second call record comprising a second called party number from the calling list for a second outgoing call; and
    originate the second outgoing call based using the second calling party telephone number.

11. The non-transitory computer readable medium of claim 10, further storing instructions that when executed cause one or more computer processors to:
    determine the call outcome metric does not exceed the threshold level;
    in response to determining the call outcome metric does not exceed the threshold level, select a third call record comprising a third called party number from the calling list for a third outgoing call; and
    originate the third outgoing call based using the second calling party telephone number.

12. The non-transitory computer readable medium of claim 10, wherein the threshold comprises a counter measuring prior calls encountering a busy condition and further storing instructions that when executed cause one or more computer processors to:
    increment the counter in response to the first call reaching the busy condition.

13. The non-transitory computer readable medium of claim 10, wherein the threshold reflects an answer rate for prior call originations, and wherein the call outcome metric exceeding the threshold level reflects the answer rate dropping below the threshold level.

14. The non-transitory computer readable medium of claim 10, further storing instructions that when executed cause one or more computer processors to:

modify the call outcome metric in response to a call outcome of the first outgoing call.

15. The non-transitory computer readable medium of claim 10, further storing instructions that when executed cause one or more computer processors to:

reset the call outcome metric after selecting the second calling party telephone number from the pool.

16. The non-transitory computer readable medium of claim 10, further storing instructions that when executed cause one or more computer processors to:

modify the robocall tag in memory after a defined time period to reflect the first calling party number is available for use.

17. The non-transitory computer readable medium of claim 10, further storing instructions that when executed cause one or more computer processors to:

set the robocall tag to one of at least two values comprising a first value and a second value, wherein the first value indicates the first calling party number number is available for use for call originations and the second value indicates the number is unavailable for use for call originations.

18. A method for selecting calling party telephone numbers for outgoing calls, comprising:

retrieving by a computer processor a first called party telephone number in a first call record from a plurality of calling records in a calling list for a first outgoing call;

originating the first outgoing call by a dialer directed to the first called party telephone number using a first calling party telephone number from a pool comprising a plurality of calling party telephone numbers to indicate a first caller-ID for the first outgoing call;

retrieving a call outcome metric stored in a memory in the dialer, the call outcome metric indicating call outcome information of prior calls originated using the first calling party number;

determining the call outcome metric exceeds a threshold level by the computer processor;

in response to determining the call outcome metric exceeds the threshold level, associate a robocall tag with the first calling party number in the memory by the computer processor reflecting the first calling party number is unavailable for use in originating calls;

selecting a second calling party telephone number from the pool by the computer processor after determining the call outcome metric exceeds a threshold level;

retrieving a second call record by the computer processor comprising a second called party number from the calling list for a second outgoing call; and originating the second outgoing call by the dialer based using the second calling party telephone number.

19. The method of claim 18, wherein the dialer originates VoIP calls to a service provider.

20. The method of claim 18, further comprising:

determining the call outcome metric does not exceed the threshold level;

in response to determining the call outcome metric does not exceed the threshold level, selecting a third call record comprising a third called party number from the calling list for a third outgoing call; and originating the third outgoing call based using the second calling party telephone number.

* * * * *